(12) United States Patent
Safonov et al.

(10) Patent No.: US 8,724,189 B2
(45) Date of Patent: *May 13, 2014

(54) IMAGE FORMING APPARATUS AND METHOD OF COPYING TWO-SIDED CARD THEREOF

(71) Applicant: Samsung Electronics Co., Ltd, Suwon-si (KR)

(72) Inventors: Ilia V. Safonov, Moscow (RU); Sang-ho Kim, Suwon-si (KR); Ho-keun Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,958

(22) Filed: Jul. 16, 2013

(65) Prior Publication Data

US 2013/0293917 A1   Nov. 7, 2013

Related U.S. Application Data

(63) Continuation of application No. 12/966,231, filed on Dec. 13, 2010, now Pat. No. 8,508,811.

(30) Foreign Application Priority Data

Dec. 14, 2009 (RU) ................................ 2009146134
May 6, 2010 (KR) ........................ 10-2010-0042434

(51) Int. Cl.
    *H04N 1/04* (2006.01)
(52) U.S. Cl.
    USPC ............ 358/474; 358/450; 358/540; 382/312

(58) Field of Classification Search
    CPC .......... H04N 1/00456; H04N 1/00721; H04N 1/3876; H04N 1/393
    USPC ................ 358/474, 540, 537, 523, 450, 1.15, 358/1.13, 1.18, 448, 482, 1, 9, 19; 235/451, 235/454, 449
    See application file for complete search history.

(56) References Cited

U.S. PATENT DOCUMENTS

| | | | | |
|---|---|---|---|---|
| 4,598,196 A | * | 7/1986 | Pierce et al. | 235/454 |
| 5,206,489 A | * | 4/1993 | Warwick | 235/449 |
| 7,200,285 B2 | * | 4/2007 | Li et al. | 382/289 |
| 7,515,772 B2 | * | 4/2009 | Li et al. | 382/289 |
| 7,609,399 B2 | * | 10/2009 | Tanaka | 358/1.12 |
| 8,035,635 B2 | * | 10/2011 | Shefi | 345/419 |

(Continued)

FOREIGN PATENT DOCUMENTS

| | | |
|---|---|---|
| JP | 2008-011332 | 1/2008 |
| JP | 2009-017409 | 1/2009 |

*Primary Examiner* — Negussie Worku
(74) *Attorney, Agent, or Firm* — Stanzione & Kim, LLP

(57) ABSTRACT

An image forming apparatus to copy a two-sided card is disclosed. The image forming apparatus includes a user interface unit to adjust a layout for copying both sides of the two-sided card, an image reading unit to read the both sides of the two-sided card and generates scanned images, a controlling unit to generate image data where the scanned images are laid out on at least one page according to the adjusted layout, and an output unit to output the image data generated by the controlling unit. Accordingly, the both sides of the two-sided card may be laid out and output in various types.

14 Claims, 11 Drawing Sheets

(56) References Cited

U.S. PATENT DOCUMENTS

| | | | |
|---|---|---|---|
| 8,237,967 B2* | 8/2012 | Ito | 358/1.15 |
| 8,365,072 B2* | 1/2013 | Mansfield et al. | 715/273 |
| 8,411,114 B2* | 4/2013 | Akiya | 345/641 |
| 8,508,811 B2* | 8/2013 | Safonov et al. | 358/474 |
| 2006/0250659 A1 | 11/2006 | Contino | |
| 2006/0268361 A1* | 11/2006 | Krolczyk | 358/450 |
| 2009/0009825 A1 | 1/2009 | Honda | |
| 2012/0053961 A1* | 3/2012 | Wang et al. | 705/2 |
| 2012/0086973 A1* | 4/2012 | Takahashi | 358/1.14 |

* cited by examiner

FIG. 4
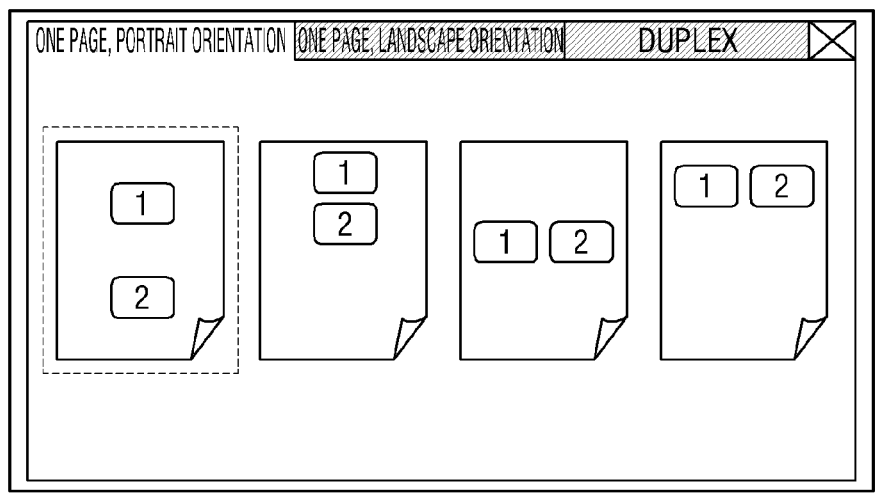
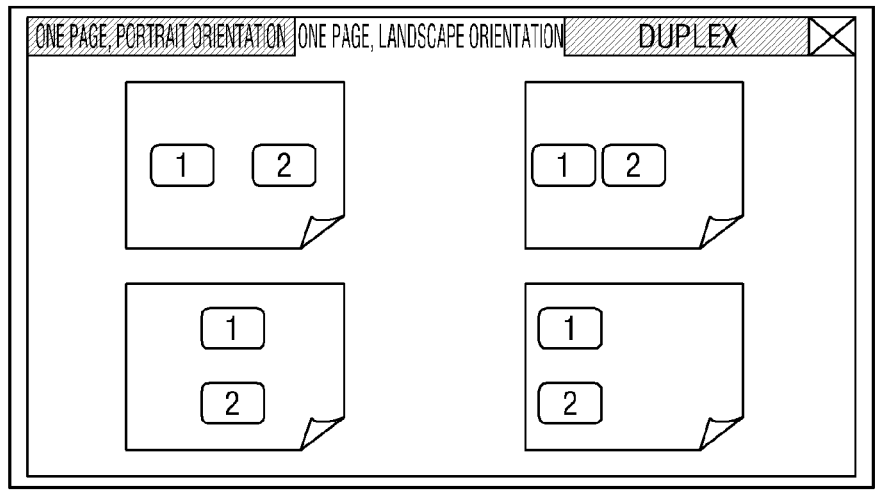
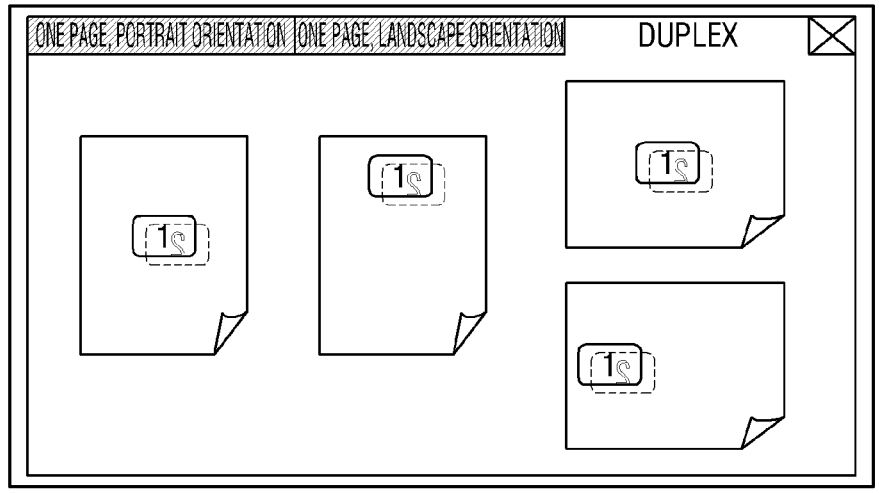

IMAGE FORMING APPARATUS AND METHOD OF COPYING TWO-SIDED CARD THEREOF

CROSS-REFERENCE TO RELATED APPLICATIONS

This is a continuation application of U.S. application Ser. No. 12/966,231, filed Dec. 13, 2013, which claims priority under 35 U.S.C. §119(a) from Korean Patent Application No. 2010-0042434, filed on May 6, 2010 in the Korean Intellectual Property Office and Russia Patent Application No. 2009146134, filed on Dec. 14, 2009 in the Russia Intellectual Property Office, the contents of which are incorporated herein by reference in their entirety.

BACKGROUND

1. Field of the Invention

The present general inventive concept relates to an image forming apparatus and a method of copying a two-sided card thereof, and, more particularly, to an image forming apparatus and a method of copying two-sided cards such as bank cards, ID cards, business cards, courtesy cards and so on, with automatic alignment, rotation and layout of card images on a piece of paper.

2. Description of the Related Art

Conventional image forming apparatuses such as an MFP apparatus has been demonstrating the "ID copy" function. In this function, a user selects an "ID copy" mode, places one side of a card on a scanner glass which corresponds to an upper half of a piece of A4 paper, and presses a copy button. The image of the one side of the card is scanned and stored in an MFP memory. Next, the user places the other side of the card on the scanner glass, and presses the copy button again. The other side of the card is scanned as well. Next, the page is rendered from the two images of the card. Finally, the page is printed. FIG. 1 demonstrates an example of copying a two-sided card using the above function.

U.S. Publication No. 2006/0268361 by Marc Krolczyk (Xerox) describes a user interface of a system for copying a two-sided identification document and a corresponding method.

Japan patent application 2009/100102 by Ocada Mamoru describes an image forming apparatus which operates in the same method as the existing "ID copy" function in general. As additional improvements, several types of methods for aligning card side images on one page were proposed.

However, the existing "ID copy" function in an MFP has several drawbacks. First, images of card sides are copied without any deskewing and orientation. Thus, a result of a copy may be significantly skewed, which would make the copy look careless. Moreover, a user may accidently place card sides in opposite orientations (rotated by 180 degrees) or one side in landscape and the other side in portrait orientation (rotated by 90 or 270 degrees).

Existing copying devices allow only one layout: a first card side copied on an upper half of a page with portrait orientation and a second card side copied on a lower half of the page. Accordingly, it is not possible to copy a card of which the size is bigger than a half of the page with portrait orientation using the "ID copy" function. Duplex copying is not possible either using the "ID copy".

Besides, a user may forget to place a front or back side of a card on the scanner and press the copy button. That is because there are no alerts for blank page copying.

Often only a part of the scanner glass corresponding to an upper half of a piece of A4 page is used for scanning in the "ID copy" mode. In this case, when a user places a card in the center of the scanner glass and copies the card, a clipped or deteriorated image of the card may be printed. Nevertheless, there are no alerts for such a user error either.

Furthermore, the "ID copy" function is not connected with such useful functions as "scan-to-FTP" and "scan-to-email". Accordingly, it is not possible to store both sides of a card to a file without additional processing by means of software on a PC.

The aforementioned existing ID copy function is illustrated in FIG. 1.

SUMMARY

The present general inventive concept provides an image forming apparatus to adjust a layout of a two-sided card and to copy the two-sided card, and a method thereof.

Additional features and utilities of the present general inventive concept will be set forth in part in the description which follows and, in part, will be obvious from the description, or may be learned by practice of the present general inventive concept.

Exemplary embodiments of the present general inventive concept can provide a method of copying a two-sided card, the method including adjusting a layout for copying a two-sided card, scanning a front side of the two-sided card, deskewing the front side of the two-sided card scanned, detecting a direction of the front side of the two-sided card scanned; scanning a back side of the two-sided card, deskewing the back side of the two-sided card scanned, detecting a direction of the back side of the two-sided card scanned; building at least one page from the front and back side images of the two-sided card according to the adjusted layout, and outputting the at least one page or storing the at least one page to a file.

Herein, the adjusting a layout for copying a two-side card selects any one of the following layout versions: copying both sides of the card on a page with portrait orientation such that each side locates in a center of an upper portion and lower portion of the page; copying both sides of the card on a page with portrait orientation such that each side locates in an upper portion of the page, one under the other; copying both sides of the card on a page with portrait orientation such that each side locates in a center of the page, one next to the other; copying both sides of the card on a page with portrait orientation such that each side locates in an upper portion of the page, one next to the other; copying both sides of the card on a page with landscape orientation such that each side locates in a center of a left and right portion of the page; copying both sides of the card on a page with landscape orientation such that each side locates in a center of the page; one under the other; copying both sides of the card on a page with landscape orientation such that each side locates in a left portion of the page, one under the other; copying both sides of the card on a page with landscape orientation such that each side locates in a left portion of the page, one next to the other; copying both sides of the card on a page with portrait orientation such that each side locates in a center of the page, one overlapping with the other; copying both sides of the card on a page with portrait orientation such that each side locates in a center of an upper portion of the page, one overlapping with the other; copying both sides of the card on a page with landscape orientation such that each side locates in a center of the page, one overlapping with the other; and copying both sides of the card on a page with landscape orientation such that each side locates in a left portion of the page, one overlapping with the other.

The deskewing the front and back images of the two-sided card can include calculating coordinates of a bounding box of the scanned image, detecting a skew-angle of the scanned image, and if an absolute value of the skew-angle is 0.5° or more, rotating the scanned image by a minus skew-angle.

Exemplary embodiments of the present general inventive concept may also provide an image forming apparatus to copy a two-sided card, the image forming apparatus including a user interface unit to adjust a layout for copying both sides of a two-sided card, an image reading unit to read the both sides of the two-sided card and generates scanned images, a controlling unit to generate image data where the scanned images are laid out on at least one page according to the adjusted layout, and an output unit to output the image data generated by the controlling unit.

The controlling unit may deskew the scanned image, and detect an orientation of the scanned image.

The image forming apparatus may further include a storage unit to store the page built by the controlling unit.

Herein, the layout may be at least one of copying both sides of a two-sided card on a page with portrait orientation, copying both sides of a two-sided card on a page with landscape orientation, and duplex copying.

The controlling unit can calculate coordinates of a bounding box of the scanned image, detect a skew-angle of the scanned image, and when an absolute value of the detected skew-angle is 0.5° or more, can deskew the scanned image by rotating the scanned image by a minus skew-angle.

Exemplary embodiments of the present general inventive concept may also provide a method of copying a two-sided card, the method including adjusting a layout for copying both sides of a two-sided card, reading the both sides of the two-sided card to form scanned images, generating image data where the scanned images of the both sides of the two-sided card are laid out onto at least one page according to the adjusted layout, and outputting the generated page.

The method may include deskewing the scanned image, and detecting an orientation of the scanned image.

The method may also include storing the generated page.

The layout may be at least one of copying both sides of the card on a page with portrait orientation, copying both sides of the card on a page with landscape orientation, and duplex copying.

The deskewing may include calculating coordinates of a bounding box of the scanned image, detecting a skew-angle of the scanned image, and when an absolute value of the detected skew-angle is 0.5° or more, rotating the scanned images by a minus skew-angle.

According to exemplary embodiments of the present general inventive concept, the images may be deskewed and may be implemented in various forms including duplex copying. Both sides of the two-sided card may be stored to a file, and a blank page may be detected and clipping of an image may be detected during scanning. The exemplary embodiments of the present general inventive concept disclosed herein can reduce memory usage and computational complexity.

Exemplary embodiments of the present general inventive concept also provide a method of copying a two-sided card with an image forming apparatus having a scanner, the method including receiving a selection of a layout for copying both sides of the two-sided card with an input unit, scanning both sides of the two-sided card with the scanner to form images of the both sides of the two-sided card, and generating an output image to be output by the image forming apparatus by combining the formed images of the two-sided card according to the received selection of the layout.

The method may also include deskewing the scanned images of the both sides of the two-sided card with a processor of the image forming apparatus before the generating the output image.

The deskewing the scanned images in the method may include calculating coordinates of a bounding box of the scanned images, detecting a skew-angle of the scanned images, and when an absolute value of the detected skew-angle is 0.5° or more, deskewing the scanned images by rotating them by a minus skew-angle.

Exemplary embodiments of the present general inventive concept also provide an image forming apparatus to copy a two-sided card, the image forming apparatus including an input unit to receive a selection of a layout to copy both sides of the two-sided card, a scanner to scan both sides of the two-sided card to form images of the both sides of the two-sided card, and a processor to generate an output image to be output by the image forming apparatus by combining the scanned images of the two-sided card according to the received selection of the layout.

The processor of the image forming apparatus can deskew the scanned images.

The processor of the mage forming apparatus can calculate coordinates of a bounding box of the scanned images, detect a skew-angle of the scanned images, and when an absolute value of the detected skew-angle is 0.5° or more, the processor can deskew the scanned images by rotating them by a minus skew-angle.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 4 illustrates a user interface to adjust a layout according to exemplary embodiments of the present general inventive concept;

DETAILED DESCRIPTION OF THE EMBODIMENTS

Figure 1:
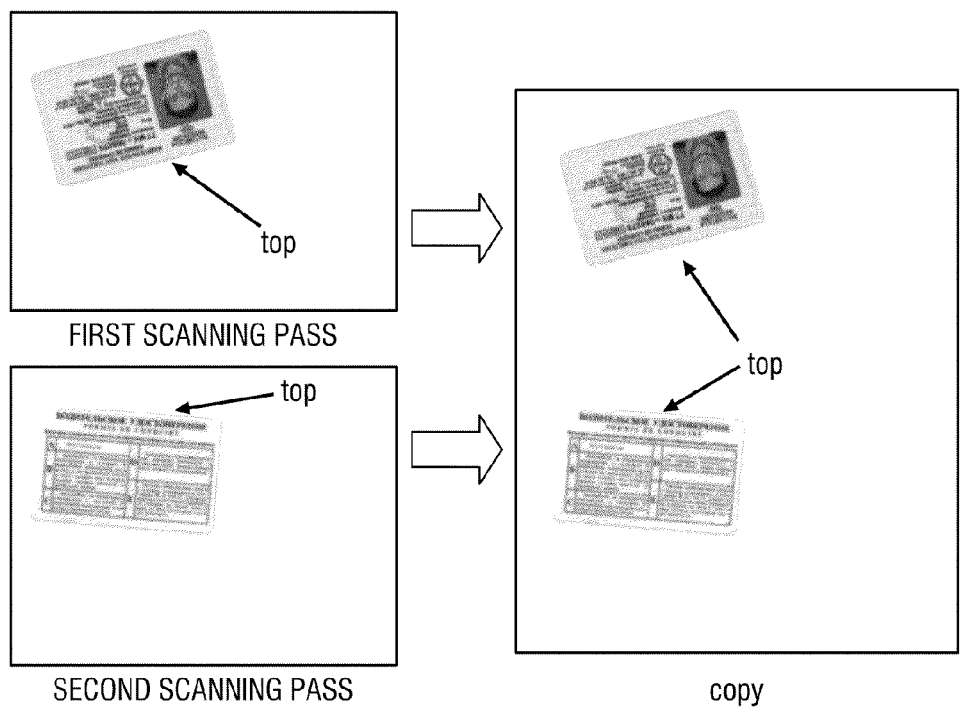
FIG. 1 illustrates an example of copying a two-sided card according to the related art.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
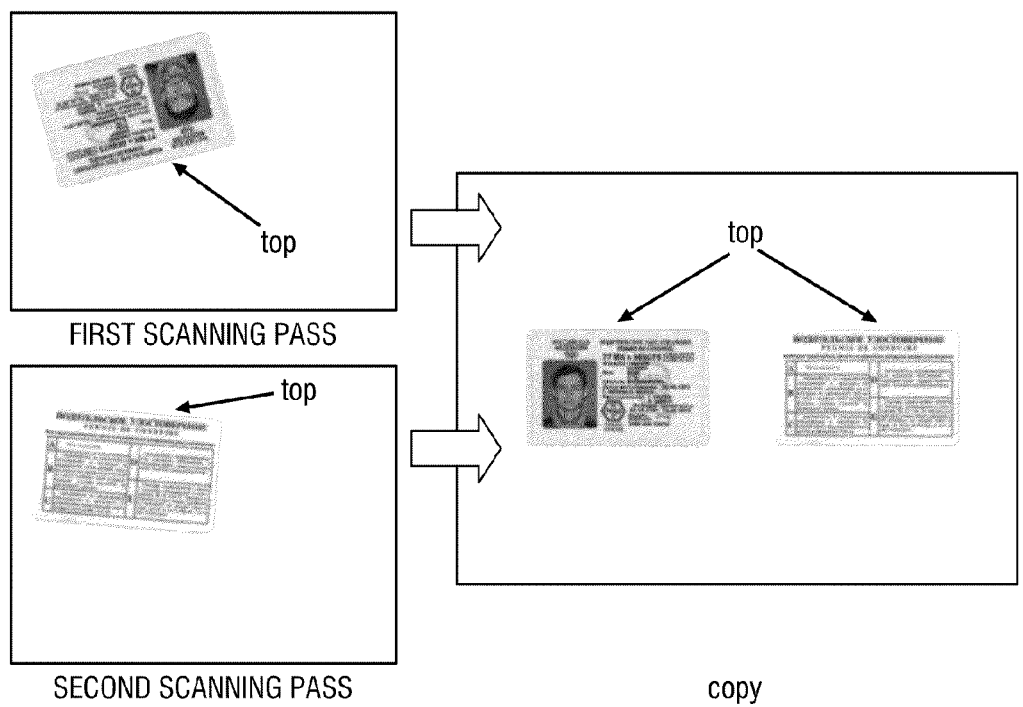
FIG. 2 illustrates a method of copying a two-sided card according to exemplary embodiments of the present general inventive concept.

FIG. 2 illustrates a method of copying a two-sided card according to exemplary embodiments of the present general inventive concept. As illustrated in FIG. 2, a first side (e.g., top side) of a two-sided card can be scanned (e.g., by the image reading unit 120 of the image forming apparatus 100 illustrated in FIG. 10 as described below) in a first scanning pass, and a second side (e.g., bottom side) of the two-sided card can be scanned in a second scanning pass. In exemplary embodiments of the present general inventive concept, a controller and/or processor (e.g., controlling unit 130 of image forming apparatus 100 illustrated in FIG. 10) can generate an image that includes the first side and second side images from the first and second scanning passes, respectively.

That is, FIG. 2 illustrates an example of a method to copy a two-sided card on a page with landscape orientation, where images of the card can be located in a center left and right of the page according to exemplary embodiments of the present general inventive concept. Deskewing, detection of orientation, rotation, and layout of an image (e.g., the images of the first side and the second side, and the generated image that includes them) according to an adjusted layout can be provided by the exemplary embodiments of the present general inventive concept as discussed in detail below, unlike the related art method illustrated in FIG. 1.

Figure 3:
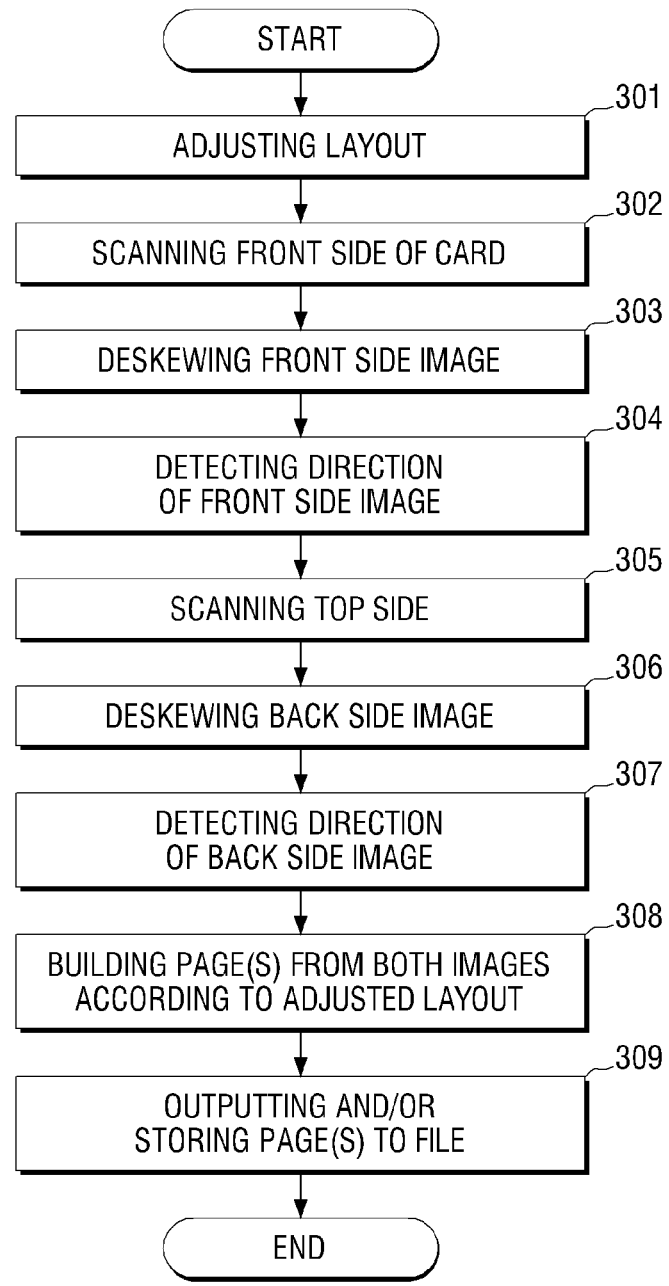
FIG. 3 is a flowchart illustrating a method of copying a two-sided card according to exemplary embodiments of the present general inventive concept.

FIG. 3 is a flowchart illustrating a method of copying a two-sided card according to exemplary embodiments of the present general inventive concept.

According to FIG. 3, a layout to copy a two-sided card through a user interface can be adjusted at operation 301.

FIG. 4 illustrates a user interface to adjust a layout according to exemplary embodiments of the present general inventive concept. That is, FIG. 4 illustrates selectable positions of the first and second sides (e.g., illustrated as number 1 and 4 in FIG. 4) from the first and second scanning passes, respectively, and their orientation on a page that may have a portrait orientation or a landscape orientation. The user interface and layouts illustrated in FIG. 4 can be used to adjust the layout to copy the two-sided card at operation 301 of FIG. 3.

Layout versions, such as those illustrated in FIG. 4, may be divided into at least three groups: (1) copying both sides of a two-sided card on a page with portrait orientation, (2) copying both sides of a two-sided card on a page with landscape orientation, and (3) duplex copying. The following are exemplary layouts, but there is no limitation and thus other layouts may be used in the exemplary embodiments of the present general inventive concept as disclosed herein. Exemplary embodiments of the present general inventive concept may include: copying both sides of a card on a page with portrait orientation such that each side locates in a center of an upper portion and lower portion of the page; copying both sides of a card on a page with portrait orientation such that each side locates in an upper portion of the page, one under the other; copying both sides of a card on a page with portrait orientation such that each side locates in a center of the page, one next to the other; copying both sides of a card on a page with portrait orientation such that each side locates in an upper portion of the page, one next to the other; copying both sides of a card on a page with landscape orientation such that each side locates in a center of a left and right portion of the page; copying both sides of a card on a page with landscape orientation such that each side locates in a center of the page, one under the other; copying both sides of a card on a page with landscape orientation such that each side locates in a left portion of the page, one under the other; copying both sides of a card on a page with landscape orientation such that each side locates in a left portion of the page, one next to the other; copying both sides of a card on a page with portrait orientation such that each side locates in a center of the page, one overlapping with the other; copying both sides of a card on a page with portrait orientation such that each side locates in an upper portion of the page, one overlapping with the other; copying both sides of a card on a page with landscape orientation such that each side locates in a center of the page, one overlapping with the other; and copying both sides of a card on a page with landscape orientation such that each side locates in a left portion of the page, one overlapping with the other.

Referring again to FIG. 3, a front side of the two-sided card can be scanned at operation 302. At operation 303, the front side image may be deskewed. That is, if there is any skew of the scanned imaged of the front side of the card because of its orientation during the scanning operation 302, the amount of skew can be detected, and the detected skew can be removed and/or minimized at operation 303. A direction of the front side image can be detected at operation 304. That is, at operation 304, it may be determined whether the front side image is oriented at 0, 45, 90, 120, and/or 180 degrees, or at any other suitable position.

The scanning operation 305, deskewing operation 306, and direction detecting operation 307 can be performed on a back side of the two-sided card as well. Operations 305, 306, and 307 may be similar to and or the same as operations 302, 303, and 304, respectively, but they are performed on the back side of the two-sided card, rather than the front side of the two-sided card.

One or more pages from both side images (e.g., the scanned front side image and the back side image) can be formed by duplex copying at operation 308. Scanned images can be rotated according to an adjusted layout (e.g., where the layout may be adjusted according to the selected adjusted layout at operation 301) and detected orientation. That is, the adjusted layout may include the placement of the front side and back side images on a page relative to one another, the orientation of the page (e.g., portrait or landscape orientation), and/or any other suitable layout selections to carry out the exemplary embodiments of the present general inventive concept.

Figure 5:
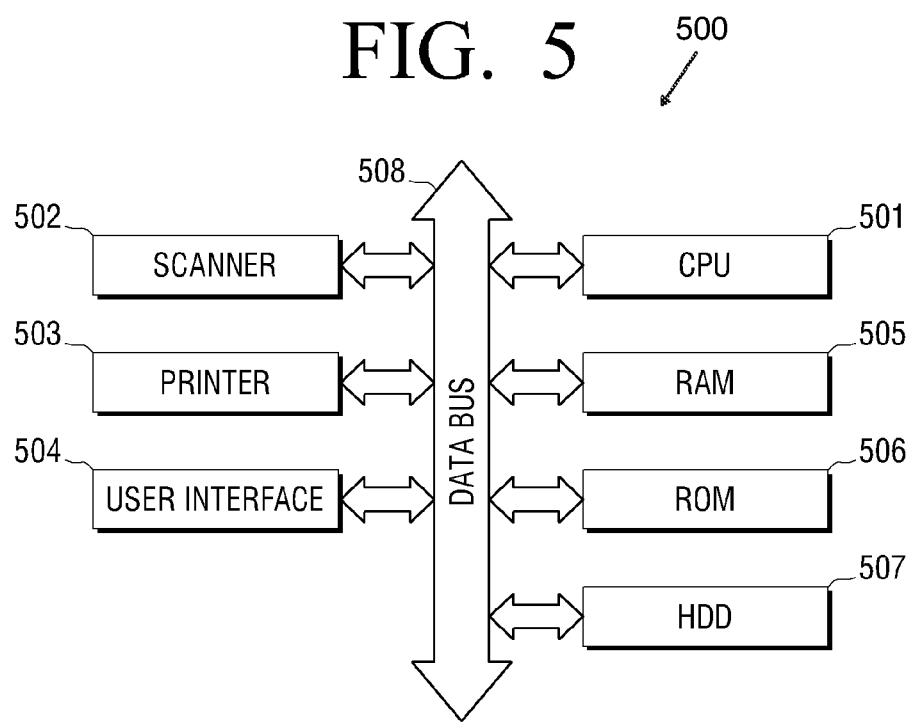
FIG. 5 is a block diagram illustrating an image forming system to copy a two-sided card according to exemplary embodiments of the present general inventive concept.

One or more pages can be output (e.g., output to printer 503 illustrated in FIG. 5) and/or stored to a file (e.g., the file may be stored in RAM 505 and/or hard disk drive (HDD) 507 illustrated in FIG. 5) at operation 309. For example, the one or more pages can be stored in a PDF file (e.g., to be attached to an email).

FIG. 5 is a block diagram illustrating an image forming system 500 to copy a two-sided card according to exemplary embodiments of the present general inventive concept.

The image forming system 500 illustrated in FIG. 5 may be a MFP (multi-function printer) apparatus (e.g., an apparatus that includes one or more of scanning, printing, copying, and/or faxing) or a digital copier.

The Central Processing Unit (CPU) 501 can control a scanner 502, a printer 503, a user interface 504, RAM (random access memory) 505, ROM (read only memory) 506, HDD (hard disk drive) 507, and data bus 508 of the image forming system 500. The CPU 501 can be a processor, a filed programmable gate array, a programmable logic device, an application specific integrated circuit, a controller, and/or any other suitable device to carry out the exemplary embodiments of the present general inventive concept. Both sides of a card can be scanned by a scanner 502. Generated image pages that may be formed from the scanner 502 can be output to a duplex printer 503 to be printed. Printer 503 may be a laser printer, an inkjet printer, a thermal printer, and/or any other suitable printer to carry out the exemplary embodiments of the present general inventive concept. A user interface module 54 can receive input to adjust a layout. The user interface module 54 may be a touch-screen display, or may include a display on a display device, where a keyboard, keypad, and/or input device may receive input of an adjustment selection to adjust a layout.

The scanned images and rendered pages can be stored in the RAM 505 of the image forming system 500. The CPU 501 may form one or more pages by executing program codes stored in the ROM 506 and/or HDD 507, but can also deskew and detect directions of card images.

The hard disk drive (HDD) 507 can store the one or more rendered to at least one file. In exemplary embodiments of the present general inventive concept, the HDD 507 can be a hard disk drive, a solid state drive, or any other suitable non-volatile memory. The image forming system can include the data bus 508 to transmit data between the modules of the system (e.g., between the scanner 502, the printer 503, the user interface 504, the RAM (random access memory) 505, the ROM (read only memory) 506, the HDD (hard disk drive) 507, and the CPU 501).

Figure 6:
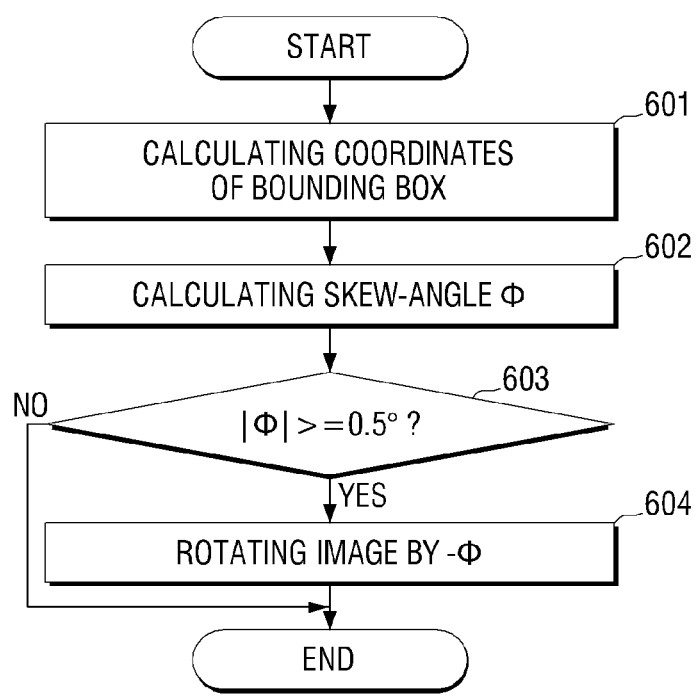
FIG. 6 is a flowchart illustrating an image deskewing method according to exemplary embodiments of the present general inventive concept.

FIG. 6 is a flowchart illustrating a method of deskewing images according to exemplary embodiments of the present general inventive concept.

The method illustrated in FIG. 6 can deskew front side and back side images of a two-sided card. At operation 601, coordinates of a bounding box can be calculated. That is, a bounding box may be arranged around at least a portion of the scanned image of the front side and/or the back side image that is determined to include skew, and that is to be deskewed according to the method illustrated in FIG. 6. The CPU 501 illustrated in FIG. 5 can determine the skewed portion of the image, and can determine coordinates for a bounding box to be placed around the portion of the image. A skew angle can be detected at operation 602 of at least the area bounded by the bounding box. At operation 603, it is determined whether an absolute value of the skew angle is greater than or equal to 0.5 degrees. When the absolute value of the skew angle is greater than or equal to 0.5 degrees, the image can be rotated by a minus (e.g., negative) skew angle at operation 604. That is, the skew of the image can be reduced and or eliminated by rotating the image by a predetermined and/or calculated negative skew angle. As described above and as illustrated in FIG. 6, although the inequality of operation determines whether an absolute value of the skew angle is greater than or equal to 0.5 degrees, any other suitable value in degrees may be compared to the absolute value of the skew angle in accordance with exemplary embodiments of the present general inventive concept as disclosed herein.

Figure 7:
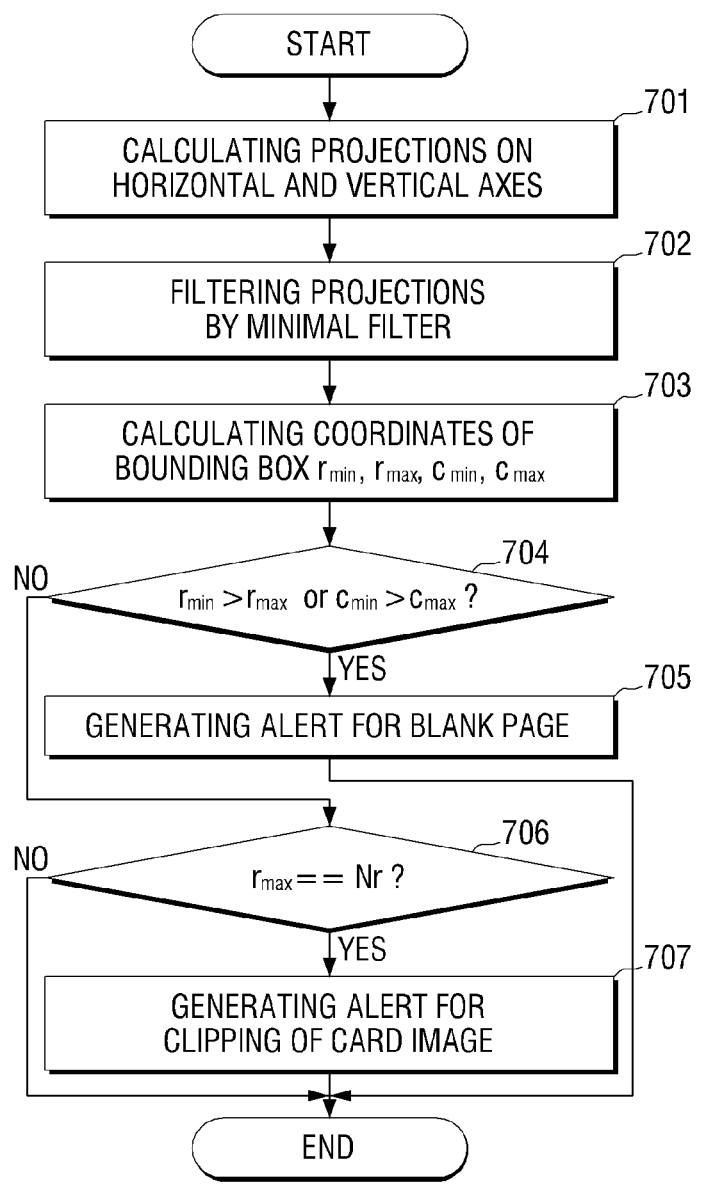
FIG. 7 is a flowchart illustrating a method of calculating coordinates of a bounding box according to exemplary embodiments of the present general inventive concept.

FIG. 7 is a flowchart illustrating a method of calculating coordinates of a bounding box according to exemplary embodiments of the present general inventive concept.

At operation 701, projections on horizontal and vertical axes can be determined (e.g., by CPU 501 illustrated in FIG. 5). In exemplary embodiments of the present general inventive concept, the projections may be calculated as follows:

$$BW(r, c) = \begin{cases} 1, & R(r, c) + G(r, c) + B(r, c) < T \\ 0, & \text{otherwise,} \end{cases}$$

$$Ph(c) = \sum_{r=1}^{Nr} BW(r, c),$$

$$Pv(r) = \sum_{c=1}^{Nc} BW(r, c),$$

where BW is a binary image (i.e., a thresholding result); r and c are coordinates of image pixels, where r is the row index and c is the column index; R, G, B are color channels of the image; Ph is a projection of the binary image BW on a horizontal axis; Nr is the number of rows in an image; Nc is the number of columns in an image; Pv is a projection of the binary image BW on a vertical axis; Nr is a number of rows in the image; Nc is a number of columns; and T is a predetermined threshold.

The projections can be filtered by a minimal (erosion) filter with structure element (aperture and/or filter mask) [1 1 1 1 1] at operation 702. Alternatively, the structure element (aperture and/or filter mask) may be 1 1 1 1 or 1 1 1 1 1. For example, the projections may be filtered as follows, where Phf is a filtered projection of the binary image on the horizontal axis, and Pvf is a filtered projection of the binary image on the vertical axis:

$$Phf(c) = \min(Ph(c-2), Ph(c-1), Ph(c), Ph(c+1), Ph(c+2)),$$

$$Pvf(r) = \min(Pv(r-2), Pv(r-1), Pv(r-1), Pv(r), Pv(r+1), Pv(r+2))$$

At operation 703, bounding box coordinates $r_{min}$, $r_{max}$ and $c_{min}$, $c_{max}$ as leftmost and rightmost positions where a magnitude of filtered projection can be greater than the predetermined threshold for vertical and horizontal projections. The bounding box (i.e., bounding rectangle) coordinates $c_{min}$ and $r_{max}$ may be coordinates of the left-top corner of the bounding box, and $c_{max}$ and $r_{max}$ may be the coordinates of the right-bottom corner of the bounding box. The coordinates of the bounding box $r_{min}$, $r_{max}$ and $c_{min}$, $c_{max}$ may be computed, calculated, and/or determined as extreme left and extreme right positions, in which the value of the filtered projection can be more than (i.e., greater than) a predetermined threshold for projections on the vertical and horizontal axes accordingly. The bounding box coordinates $r_{min}$, $r_{max}$ and $c_{min}$, $c_{max}$ can be correspondingly calculated (e.g., by CPU 501 illustrated in FIG. 5):

$$r_{min} = \min_{\forall r}(Nr, r \mid Pvf(r) > Nc/32),$$

$$r_{max} = \max_{\forall r}(1, r \mid Pvf(r) > Nc/32),$$

$$c_{min} = \min_{\forall c}(Nc, c \mid Phf(c) > Nr/32),$$

$$c_{max} = \max_{\forall c}(1, c \mid Phf(c) > Nr/32).$$

Operation 704 can determine whether or not there is a blank page. When $r_{min} > r_{max}$ or $c_{min} > c_{max}$, a blank page can be detected and an alert for a user can be generated at operation 705.

To decrease memory usage, a part of the scanner glass (e.g., a platen of scanner 502 illustrated in FIG. 5) that corresponds to an upper half of a page can be used at the scanning stage (e.g., scanning operations 302 and 305 as illustrated in FIG. 3 and described above). In this case, a clipping of card (e.g., scanning only a portion of a card, rather than the whole care) image is possible. Operation 706 can determine a clipping of an image. When $r_{max}$=Nr, a card image can be clipped and an alert can be generated at operation 707.

Figure 8:
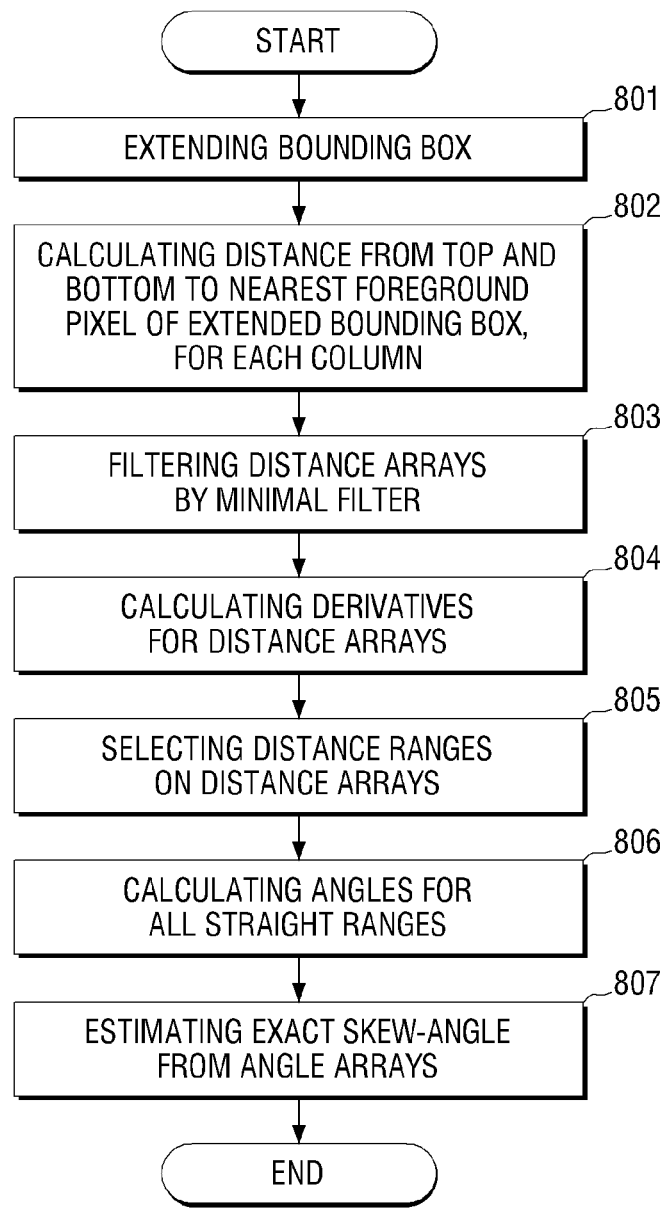
FIG. 8 is a flowchart illustrating a skew-angle detection method according to exemplary embodiments of the present general inventive concept.

FIG. 8 is a flowchart illustrating a skew-angle detection method according to exemplary embodiments of the present general inventive concept.

The exemplary embodiments of the present general inventive concept can be applied to a plurality of types of card images and can provide increased accuracy in estimating skew-angles. At operation 801, a bounding box can be extended. According to exemplary embodiments of the present general inventive concept, the extended bounding box may be determined as follows:

$$dc=(c_{max}-c_{min})/4, dr=(r_{max}-r_{min})/4,$$

$$ce_{min}=\max(1, c_{min}-dc), ce_{max}=\min(Nc, c_{max}+dc),$$

$$re_{min}=\max(1, r_{min}-dr), re_{max}=\min(Nr, r_{max}+dr).$$

where r and c are coordinates of image pixels, dc is an average change from a maximum value to a minimum value of the coordinate c, dr is an average change from a maximum value to a minimum value of the coordinate r, Nc is the number of columns in the image, the bounding box coordinates $c_{min}$ and $r_{min}$ may be coordinates of the left-top corner of the bounding box, $c_{max}$ and $r_{max}$ may be the coordinates of the right-bottom corner of the bounding box, $ce_{min}$ and $re_{min}$ are coordinates of a left-top corner of an expanded bounding box (i.e., bounding rectangle), $ce_{max}$ and $re_{max}$ are coordinates of a right-bottom corner of the expanded bounding box, and Nr is the number of rows in an image. Operation 801 can determine the presence of an image of a card side (e.g., an entire image of a card side) inside a bounding box. At operation 802, for each column, a distance from a top and bottom to a nearest foreground pixel of the extended bounding box can be calculated, and the distances can be stored to distance arrays as follows, where Dt and Db are arrays of distances from the top and bottom of the bounding box corresponding up to the nearest pixel of binary image inside of an extended bounding box (i.e., extended bounding rectangle), and c is a column index and r is a row index:

$$Dt(c) = \min\left((re_{max} - re_{min}), \min_{r \in [re_{min}, re_{max}]}(r \mid BW(r, c) = 1)\right),$$

$$Db(c) = \min\left((re_{max} - re_{min}), \max_{r \in [re_{min}, re_{max}]}(r \mid BW(r, ce_{max} - c) = 1)\right),$$

where $c \in [ce_{min}, ce_{max}]$. That is, $ce_{min}$ is the left-top corner column coordinate (i.e., column coordinate c of an image pixel) of the expanded bounding box, $ce_{max}$ is the right bottom corner column coordinate (i.e., column coordinate c of an image pixel) of the expanded bounding box, where $ce_{min}$ and $ce_{max}$ represent the linear span of the column coordinate c (i.e., $c \in [ce_{min}, ce_{max}]$).

As discussed below, the determined distance arrays can be filtered by a minimal filter. At operation 803, the distance arrays can be filtered with structure element (aperture and/or filter mask) [1 1 1 1 1] by a minimal (erosion) filter. Alternatively, the structure element (aperture and/or filter mask) may be 1 1 1 1 1. The filtration of the distance arrays may be determined as follows, where Dtf and Btf are filtered arrays of distances from the top and bottom of the bounding box cor respondingly up to the nearest pixel of the binary image inside the extended bounding box:

$$Dtf(c)=\min(Dt(c-4), \ldots, Dt(c), \ldots, Dt(c+4))$$

$$Dbf(c)=\min(Db(c-4), \ldots, Db(c), \ldots, Db(c+4))$$

At operation 804, derivatives of the distance arrays can be calculated formulas as follows:

$$dDtf(c)=Dtf(c+4)-Dtf(c-4)$$

$$dDbf(c)=Dbf(c+4)-Dbf(c-4)$$

At operation 805, the distances ranges on the distance arrays can be selected as follows:

$$\{St(i)\} = \left\{\begin{array}{c} \forall \mid dDtf(c)\mid \leq 10, \\ c \in [st1(i), st2(i)] \\ (st2(i) - st1(i)) \geq 50, Dtf(st2(i)) < \\ 3(re_{max} - re_{min})/4 \end{array}\right\}, i = 1 \ldots Nt,$$

$$\{Sb(j)\} = \left\{\begin{array}{c} \forall \mid dDbf(c)\mid \leq 10, \\ c \in [sb1(j), sb2(j)] \\ (sb2(j) - sb1(j)) \geq 50, Dbf(sb2(j)) < \\ 3(re_{max} - re_{min})/4 \end{array}\right\}, j = 1 \ldots Nb,$$

where {st1} and {sb1} are coordinates of a beginning of the straight ranges on the distance arrays from the top and bottom of the bounding box correspondingly, {st1} and {sb2} are coordinates of an ending of the straight ranges on the distance arrays from the top and bottom of bounding box correspondingly, and Nt and Nb are numbers of the straight ranges on the distance arrays from the top and bottom of bounding box correspondingly (e.g., Nt and Nb are numbers of such sites for arrays of distances from the top and bottom of the bounding box).

At operation 806, angles of one or more straight ranges can be calculated as follows:

$$dx(i) = st2(i) - st1(i) - 20,$$

$$dx(j + Nt) = sb2(j) - sb1(j) - 20,$$

$$dy(i) = \frac{1}{5}\sum_{k=-2}^{2} Dtf(st2(i) - 10 + k) - \frac{1}{5}\sum_{k=-2}^{2} Dtf(st1(i) + 10 + k),$$

$$dy(j + Nt) = \frac{1}{5}\sum_{k=-2}^{2} Dbf(sb2(i) - 10 + k) - \frac{1}{5}\sum_{k=-2}^{2} Dbf(sb1(i) + 10 + k),$$

$$\alpha(n) = arctg(dy(n)/dx(n)), N = Nb + Nt, n = 1 \ldots N,$$

where {dx} is an array of adjacent cathetus, {dy} is an array of opposite cathetus, and {α} is an array of angles.

At operation 807, skew-angles from the array of angles can be estimated, where skew-angle φ is a weighted average of angles which differ from φ on variance δ less than 1 according to the following iterative method. An initial estimation of weighted average of angles φ and variance δ can be determined as follows:

$$\varphi = \sum_{n=1}^{N} \alpha(n) \times dx(n) / \sum_{n=1}^{N} dx(n)$$

$$\delta = \frac{1}{N-1}\sqrt{\sum_{n=1}^{N}(\varphi - \alpha(n))^2}$$

Herein, if δ>25, positive and negative angles can be estimated, which may be about 45 and −45 degrees, where by is a function to indicate a predetermined large positive angle, bn is a function to indicate a large negative angle, qap is a number (i.e., plurality) of predetermined large positive angles, qan is a number (i.e., plurality) of big negative angles, sap is a sum of predetermined large positive angles; qan is the sum of the predetermined large negative angles, and san is the sum of the predetermined large negative angles, as follows:

$$bp(x) = \begin{cases} 1, x > 38° \\ 0, \end{cases} bn(x) = \begin{cases} 0, x < -38° \\ 0, \end{cases}$$

$$qap = \sum_{n=1}^{N} bp(\alpha(n)), qan = \sum_{n=1}^{N} bn(\alpha(n)),$$

$$sap = \sum^{N} \alpha(n) \times bp(\alpha(n)), san = \sum^{N} \alpha(n) \times bn(\alpha(n)),$$

If qap>0 and qan>0, δ=0, then δ=0, and if sap>san, then φ=sap/qap, or else φ=sap/qan.

In the iterative method as described in part above, iterations can be continued while variance δ>1. If (α(n)<φ−δ) or (α(n) <φ+δ), then α(n) and dx(n) can be excluded from one or more arrays, and estimation of weighted average of angles φ and variance δ can be determined as follows:

$$\varphi = \sum_{n=1}^{N} \alpha(n) \times dx(n) \Big/ \sum_{n=1}^{N} dx(n)$$

$$\delta = \frac{1}{N-1} \sqrt{\sum_{n=1}^{N} (\varphi - \alpha(n))^2}$$

Image rotation is a well-known procedure. Generally, for a rotation about angle φ, the following transformation matrix can be used:

$$[x^1 \quad y^1] = [x \quad y] \begin{bmatrix} \cos\varphi & -\sin\varphi \\ \sin\varphi & \cos\varphi \end{bmatrix}$$

However, when performing image rotation using the transformation matrix, an additional memory buffer to store at least a part of the rotated image may be used (e.g., the image forming apparatus 100 of FIG. 10 or the image forming system 500 can include an additional memory buffer), as it may be impractical for copying devices where memory size is limited and operations with RAM may have decreased performance. In exemplary embodiments of the present general inventive concept, a rotation of the image about skew angle φ may be performed without using additional memory buffers via two shears according to the following transformation matrices:

$$[x^1 \quad y^1] = [x \quad y] \begin{bmatrix} \cos\varphi & 0 \\ \sin\varphi & 1 \end{bmatrix} \begin{bmatrix} 1 & -\tan\varphi \\ 0 & \sec\varphi \end{bmatrix}$$

One or more interpolation algorithms can be applied during rotation. For example, applying a bilinear interpolation may provide increased image quality and processing speed.

In detecting an orientation of a card, directions of ciphers (Arabic digits) can be detected. Identification (ID) cards, credit cards, and/or business cards can typically have one or more ciphers. Although digits '6', '9' and '8' can be examples of rotation invariant ciphers for a 180 degrees rotation (i.e., '6' and '9' may be indistinguishable from one another when rotated 180 degrees, and '8' may appear the same when it is rotated), ciphers such as '1', '2', '3', '4', '5', and '7' can be used to detect an orientation. That is, an orientation of ciphers such as '1', '2', '3', '4', '5', and '7' have a common usage orientation (e.g., where the usage orientation of these ciphers may be preset), any other orientation of these ciphers that is different from the common usage orientation may be used to detect a degree of rotation or skew from the common usage orientation). Typical problems in ciphers detection can include, for example: cards having a complex color background (e.g., multi-colored background, or a background which obscures the identification of a cipher); ciphers that may have an arbitrary color, where the cypher can be dark on a light background or the cipher can be light on a dark background; or typefaces for different ciphers on the same card can differ. For digits segmentation on a complex background (e.g., a background having a plurality of colors), labeling of connected edge regions can be used, where edge pixels can be labeled for dark ciphers on a light background and edge pixels can be labeled for light ciphers on a dark background. In exemplary embodiments of the present general inventive concept, a decision tree with a generalization can categorize and/or recognize digits, characters, and/or ciphers, so as to recognize a plurality of typefaces.

Figure 9:
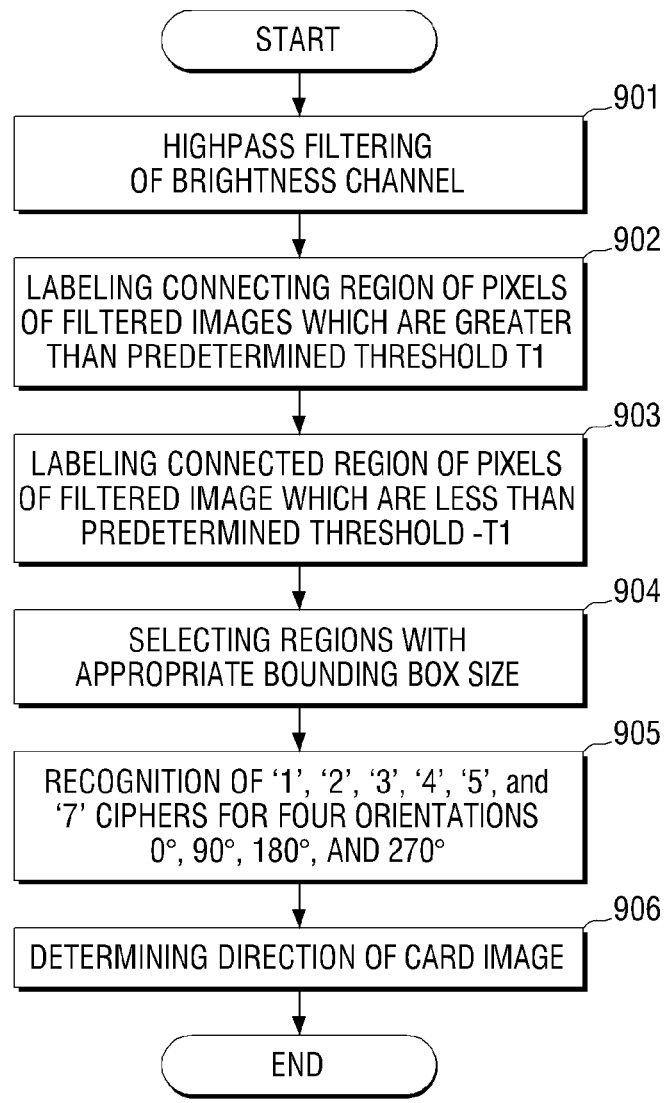
FIG. 9 is a flowchart illustrating an image orientation detection method according to exemplary embodiments of the present general inventive concept.

FIG. 9 illustrates a method of detecting an image orientation according to exemplary embodiments of the present general inventive concept.

The exemplary method illustrated in FIG. 9 can detect orientations of deskewed images of a front and back side of a two-sided card identically. That is, the method of the front side detection of deskewed images may be the same for a front side of a card and a back side of a card. At operation 901, a high-pass filtering of an image brightness channel can be performed by a convolution with a kernel, such as with the exemplary kernel as follows:

$$\begin{bmatrix} 1 & 0 & 1 & 0 & 1 \\ 0 & 0 & 0 & 0 & 0 \\ 1 & 0 & -8 & 0 & 1 \\ 0 & 0 & 0 & 0 & 0 \\ 1 & 0 & 1 & 0 & 1 \end{bmatrix}$$

That is, an image brightness channel (that may be calculated as described below) of a scanned image of a front side of a card and/or a back side of a card can be filtered using a predetermined filter level (e.g., the pixels and/or values in the image brightness channel that are above a predetermined level pass through the filter, and those that are equal to or less than the predetermined level are retained by the filter). The values and/or pixels of the image brightness channel may be convolved with the exemplary matrix kernel above, or with any other suitable kernel to carry out the exemplary embodiments of the present general inventive concept.

A brightness channel can be calculated as (R(r,c)+G(r,c)+ B(r,c))/3, where R is a red channel, G is a green channel, and B is a blue channel, and r and c are coordinates of the image pixel.

At operation 902, connected regions (e.g., regions of pixels that are adjacent to one another in an image) can be labeled for pixels of a filtered image which are greater than predetermined threshold T1, where the pixels can correspond to inner edges of dark symbols on a light background. At operation 903, connected regions can be labeled for pixels of a filtered image which are less than predetermined threshold −T1, where the pixels correspond to inner edges of light symbols on a dark background. For each connected region from both labeled images, at least one bounding box is calculated, and regions with appropriate and/or predetermined bounding box size can be selected at operation 904. For example, supposing F is a binary image of a connected region, Mr×Mc is a size of the image F, where Mr is the number of rows (i.e., height) and Mc is the number of columns (i.e., width), and r and c are coordinate values of pixels in an image. In exemplary embodiments of the present general inventive concept, a 300 dpi scanning resolution criteria for selection of appropriate regions is as follows: Mr>=14 and Mc>=14 and Mr<=70 and Mc<=70 and (Mr/Mc>1.2 or Mc/Mr>1.2).

For each connected region, recognition of at least '1', '2', '3', '4', '5', and '7' ciphers for four exemplary orientations 0°, 90°, 180°, and 270° of the region and calculation of the number of recognized regions for each orientation can be determined at operation 905. At operation 906, a card image orientation Ω according to the numbers of recognized regions for each orientation can be determined as follows:

$$\Omega = \underset{i \in \{0,90,180,270\}}{i} \Big| \max((0.5N_1(i) + N_2(i) + N_3(i) + N_4(i) + N_5(i) + 0.5N_7(i)) \times \times$$
$$(\text{sign}(N_1(i)) + \text{sign}(N_2(i)) + \text{sign}(N_3(i)) +$$
$$\text{sign}(N_4(i)) + \text{sign}(N_5(i)) + \text{sign}(N_7(i)))),$$

where $N_1(i)$, $N_2(i)$, $N_3(i)$, $N_4(i)$, $N_5(i)$ and $N_7(i)$ are numbers of recognized regions as ciphers '1', '2', '3', '4', '5', '7' accordingly for orientation i. $N_1(i)$ and $N_7(i)$ can be summed with an exemplary attenuation coefficient of 0.5 because probability of false positive error can be greater for '1' and '7' in comparison with other digits. Detection of a plurality of digits can indicate orientation with increased probability because the sum of recognized regions for each digit can be multiplied according to the quantity of recognized ciphers.

To minimize memory usage and to provide a time-effective implementation, a two-pass labeling scheme may be used according to exemplary embodiments of the present general inventive concept, where a first pass can include calculating a bounding box of connected regions for dark and light symbols separately, and a second pass can label regions according to a size of a bounding box and can label recognized ciphers for the regions one by one (e.g., each recognized cipher of a region can be labeled).

In exemplary embodiments of the present general inventive concept, to recognize a '1' cipher, the following features can be calculated:

$$f1_1 = Mr/Mc;$$

$$f1_2 = \max\left(\sum_{r=1}^{Mr}\sum_{c=Mc-1}^{Mc} F(r,c); \sum_{r=1}^{Mr}\sum_{c=Mc-2}^{Mc-1} F(r,c)\right) / (2Mr);$$

$$f1_3 = \sum_{r=Mr/2}^{Mr}\sum_{c=1}^{Mc/2-1} F(r,c);$$

$$f1_4 = \sum_{r=1}^{Mc/2-1}\sum_{c=1}^{Mc/2-r} F(r,c);$$

$$f1_5 = \sum_{r=Mc/2}^{Mr/2}\sum_{c=2}^{3} F(r,c).$$

Using the above calculations, if the following inequalities (i.e., rule) are determined to be true, connected region F corresponds to the cipher '1': $f1_1>=2$ and $f1_1<=3.5$ and $f1_2>=0.7$ and $f1_3=0$ and $f1_4=0$ and $f1_5>=4$.

In exemplary embodiments of the present general inventive concept, to recognize a '2' cipher, the following features can be calculated:

$$f2_1 = Mr/Mc;$$

$$f2_2 = \max\left(\sum_{r=Mr-1}^{Mr}\sum_{c=1}^{Mc} F(r,c); \sum_{r=Mr-2}^{Mr-1}\sum_{c=1}^{Mc} F(r,c)\right) / (2Mc);$$

$$f2_3 = \sum_{c=3Mr/5}^{3Mr/4}\sum_{r=0}^{c-3Mr/5} F(Mr-r,c);$$

$$f2_4 = \sum_{r=1}^{2}\sum_{c=1}^{2} F(r,c) + \sum_{r=1}^{2}\sum_{c=Mc-1}^{Mc} F(r,c);$$

$$f2_5 = \max\left(\begin{array}{c}\sum_{r=1}^{2}\sum_{c=Mc/3}^{2Mc/3} F(r,c); \\ \sum_{r=2}^{3}\sum_{c=Mc/3}^{2Mc/3} F(r,c)\end{array}\right) / (2(Mc/3+1));$$

$$f2_6 = \max\left(\begin{array}{c}\sum_{r=Mr/5}^{2Mr/5}\sum_{c=Mc-1}^{Mc} F(r,c); \\ \sum_{r=Mr/5}^{2Mr/5}\sum_{c=Mc-2}^{Mc-1} F(r,c)\end{array}\right) / (2(Mr/5+1));$$

$$f2_7 = \sum_{r=Mr/2}^{2Mr/3}\sum_{c=1}^{2Mr/3-r+1} F(r,c).$$

Using the calculations above, if the following inequalities are determined to be true, connected region F corresponds to the cipher '2': $f2_1>=1.1$ and $f2_1<=2.2$ and $f2_2>=0.65$ and $f2_3=0$ and $f2_4=0$ and $f2_5>0.65$ and $f2_6>0.55$ and $f2_7=0$.

In exemplary embodiments of the present general inventive concept, to recognize a '3' cipher, the following features are calculated:

$$f3_1 = Mr/Mc;$$

$$f3_2 = \max\left(\begin{array}{c}\sum_{r=1}^{2}\sum_{c=Mc/3}^{2Mc/3} F(r,c); \\ \sum_{r=2}^{3}\sum_{c=Mc/3}^{2Mc/3} F(r,c)\end{array}\right) / 2(Mc/3+1);$$

$$f3_3 = \max\left(\begin{array}{c}\sum_{r=Mr-1}^{Mr}\sum_{c=Mc/3}^{2Mc/3} F(r,c); \\ \sum_{r=Mr-2}^{Mr-1}\sum_{c=Mc/3}^{2Mc/3} F(r,c)\end{array}\right) / (2(Mc/3+1));$$

$$f3_4 = \max \begin{pmatrix} \sum_{r=3Mr/5}^{4Mr/5} \sum_{c=Mc-1}^{Mc} F(r,c); \\ \sum_{r=3Mr/5}^{4Mr/5} \sum_{c=Mc-2}^{2Mc-1} F(r,c) \end{pmatrix} / (2(Mr/5+1));$$

$$f3_5 = \max \begin{pmatrix} \sum_{r=Mr/5}^{2Mr/5} \sum_{c=Mc-2}^{Mc-1} F(r,c); \\ \sum_{r=Mr/5}^{2Mr/5} \sum_{c=Mc-3}^{2Mc-2} F(r,c) \end{pmatrix} / (2(Mr/5+1));$$

$$f3_6 = \max \begin{pmatrix} Mc - \max_{\forall i \in [1,Mc]} (i \mid F(Mr/2, i) = 1), \\ Mc - \max_{\forall i \in [1,Mc]} (i \mid F(Mr/2-1, i) = 1), \\ Mc - \max_{\forall i \in [1,Mc]} (i \mid F(Mr/2-2, i) = 1) \end{pmatrix} / Mc;$$

$$f3_7 = \min \begin{pmatrix} \min_{\forall i \in [1,Mc]} (i \mid F(Mr/2, i) = 1), \\ \min_{\forall i \in [1,Mc]} (i \mid F(Mr/2-1, i) = 1), \\ \min_{\forall i \in [1,Mc]} (i \mid F(Mr/2+1, i) = 1) \end{pmatrix} / Mc;$$

$$f3_8 = \sum_{r=Mr-1}^{Mr} \sum_{c=1}^{2} F(r,c) + \sum_{r=Mr-1}^{Mr} \sum_{c=Mc-1}^{Mc} F(r,c);$$

$$f3_9 = 15 \sum_{r=Mr/3+1}^{2Mr/3} \sum_{c=1}^{2Mc/5} F(r,c)/(2McMr);$$

$$f3_{10} = \sum_{r=1}^{2} \sum_{c=1}^{2} F(r,c) + \sum_{r=1}^{2} \sum_{c=Mc-1}^{Mc} F(r,c);$$

$$f3_{11} = 64 \sum_{r=Mr/3-(Mr-2)/16}^{Mr/3+(Mr-2)/16} \sum_{c=Mc/2-(Mc-2)/16}^{Mc/2+(Mc-2)/16} F(r,c)/((Mc-2)(Mr-2));$$

$$f3_{12} = 64 \sum_{r=2Mr/3-(Mr-2)/16}^{2Mr/3+(Mr-2)/16} \sum_{c=Mc/2-(Mc-2)/16}^{Mc/2+(Mc-2)/16} F(r,c)/((Mc-2)(Mr-2));$$

$$f3_{13} = \left(\left(\max_{\forall j \in [Mr/4, Mr/2-(Mr-2)/16]} \left(\min_{\forall i \in [1,Mc]} (i \mid F(j,i)=1)\right)\right) - 1\right)/Mc;$$

$$f3_{14} = \left(\left(\max_{\forall j \in [Mr/2+(Mr-2)/16, 3Mr/4]} \left(\min_{\forall i \in [1,Mc]} (i \mid F(j,i)=1)\right)\right) - 1\right)/Mc;$$

$$f3_{15} = 64 \sum_{r=Mr/2-(Mr-2)/16} \sum_{c=Mc/2+1-(Mc-2)/16} F(r,c)/((Mc-2)(Mr-2)).$$

Using the above calculations, if the following inequalities are determined to be true, connected region F corresponds to the cipher '3': $f3_1 > 1$ and $f3_1 < 2$ and $f3_2 >= 0.6$ and $f3_3 >= 0.7$ and $f3_4 > 0.65$ and $f3_5 >= 0.5$ and $f3_6 > 0$ and $f3_6 < 0.5$ and $f3_7 > 0.2$ and $f3_7 < 0.65$ and $f3_8 <= 1$ and $f3_9 < 0.35$ and $f3_{10} <= 1$ and $f3_{11} < 0.35$ and $f3_{12} < 0.35$ and $f3_{13} > 0.3$ and $f3_{14} > 0.35$ and $f3_{15} > 0$.

In exemplary embodiments of the present general inventive concept, to recognize a '4' cipher, the following features are calculated:

$$f4_1 = Mr/Mc;$$

$$f4_2 = \sum_{r=1}^{Mr/3} \sum_{c=1}^{Mc/3-r-1} F(r,c);$$

$$f4_3 = \sum_{r=5Mr/6+1}^{Mr} \sum_{c=1}^{Mc/3} F(r,c);$$

$$f4_4 = \max_{i \in [Mr/2+2, 4Mr/5]} \left(\sum_{c=1}^{Mc} F(i,c)\right)/Mc;$$

$$f4_5 = 2 \max_{j \in [3Mc/4, 5Mc/6]} \left(\sum_{r=Mr/2}^{Mr} F(r,j)\right)/Mr;$$

$$f4_6 = \left(\sum_{r=1}^{Mr/2} \sum_{c=Mc-1}^{Mc} F(r,c) + 3 \sum_{r=5Mr/6}^{Mr} \sum_{c=Mc-1}^{Mc} F(r,c)\right)/Mr;$$

$$f4_7 = \sum_{r=Mr/5}^{Mr/2} \sum_{c=Mc/5}^{Mc/2} F(r,c)/((3Mr/10+1)(3Mc/10+1));$$

$$f4_8 = 64 \min \begin{pmatrix} \sum_{r=Mr/2+1-(Mr-2)/16}^{Mr/2+1+(Mr-2)/16} \sum_{c=Mc/2+1-(Mc-2)/16}^{Mc/2+1+(Mc-2)/16} F(r,c), \\ \sum_{r=Mr/2+1-(Mr-2)/16}^{Mr/2+1+(Mr-2)/16} \sum_{c=Mc/2-(Mc-2)/16}^{Mc/2+(Mc-2)/16} F(r,c), \end{pmatrix} / \begin{pmatrix} (Mc-2) \\ (Mr-2) \end{pmatrix};$$

Using the above calculations, if the following inequalities are determined to be true, connected region F corresponds to the cipher '4': $f4_1 >= 1$ and $f4_1 <= 2.5$ and $f4_2 = 0$ and $f4_3 = 0$ and $f4_4 > 0.65$ and $f4_5 >= 0.8$ and $f4_7 > 0.2$ and $f4_7 < 0.6$ and $f4_8 <= 0.2$.

In exemplary embodiments of the present general inventive concept, to recognize a '5' cipher, the following features are calculated:

$$f5_1 = Mr/Mc;$$

$$f5_2 = \max \begin{pmatrix} \sum_{r=1}^{2} \sum_{c=3}^{Mc-2} F(r,c); \\ \sum_{r=2}^{3} \sum_{c=3}^{Mc-2} F(r,c) \end{pmatrix} / (2(Mc-4));$$

$$f5_3 = \max \begin{pmatrix} \sum_{r=Mr-1}^{Mr} \sum_{c=Mc/3}^{2Mc/3} F(r,c); \\ \sum_{r=Mr-2}^{Mr-1} \sum_{c=Mc/3}^{2Mc/3} F(r,c) \end{pmatrix} / (2(Mc/3+1));$$

$$f5_4 = \left(Mc - \left(\min_{\forall j \in [Mr/5+1, 2Mr/5]} \left(\max_{\forall i \in [1,Mc]} (i \mid F(j,i)=1)\right)\right)\right)/Mc;$$

$$f5_5 = 25 \max \begin{pmatrix} \sum_{r=Mr/5+1}^{2Mr/5} \sum_{c=1}^{Mc-5} F(r,c); \\ \sum_{r=Mr/5+1}^{2Mr/5} \sum_{c=Mc/5}^{2Mc/5} F(r,c) \end{pmatrix} / (McMr);$$

$$f5_6 = \begin{pmatrix} \min_{\forall i \in [3Mr/5, Mr]} (i \mid F(i,j)=1) \text{ and} \\ j \in [Mc/2, Mc] \end{pmatrix} / Mr;$$

$$f5_7 = \sum_{r=Mr-1}^{Mr} \sum_{c=Mc-1}^{Mc} F(r,c).$$

Using the above calculations, the following inequalities are true, connected region F corresponds to '5': $f5_1 >= 1.2$ and $f5_1 <= 2.1$ and $f5_2 > 0.7$ and $f5_3 >= 0.6$ and $f5_4 >= 0.5$ and $f5_5 > 0.3$ and $f5_6 < 0.7$ and $f5_7 = 0$.

In exemplary embodiments of the present general inventive concept, to recognize a '7' cipher, the following features are calculated:

$$f7_1 = Mr/Mc;$$

$$f7_2 = \max\begin{pmatrix} \sum_{r=1}^{2}\sum_{c=1}^{Mc} F(r,c); \\ \sum_{r=2}^{3}\sum_{c=1}^{Mc} F(r,c) \end{pmatrix} / (2Mc);$$

$$f7_3 = \left( \max_{\forall j \in [Mr/4, Mr]} \begin{pmatrix} \max_{\forall i \in [1,Mc]}(i\,|\,F(j,i)=1) - \\ \min_{\forall i \in [1,Mc]}(i\,|\,F(j,i)=1) \end{pmatrix} \right) / Mc;$$

$$f7_4 = \left( Mc - \frac{4}{Mr}\sum_{r=3Mr/4}^{Mr}\begin{pmatrix} \max_{\forall i \in [1,Mc]}(i\,|\,F(r,i)=1) - \\ \min_{\forall i \in [1,Mc]}(i\,|\,F(r,i)=1) \end{pmatrix} \right) / Mc;$$

$$f7_5 = \left( Mc - \frac{4}{Mr}\sum_{r=Mr/4}^{Mr/2}\begin{pmatrix} \max_{\forall i \in [1,Mc]}(i\,|\,F(r,i)=1) - \\ \min_{\forall i \in [1,Mc]}(i\,|\,F(r,i)=1) \end{pmatrix} \right) / Mc;$$

$$f7_6 = \sum_{r=Mr/4}^{Mr/2}\begin{pmatrix} \max_{\forall i \in [1,Mc]}(i\,|\,F(r,i)=1) - \\ \min_{\forall i \in [1,Mc]}(i\,|\,F(r,i)=1) \end{pmatrix} - \sum_{r=3Mr/4}^{Mr}\begin{pmatrix} \max_{\forall i \in [1,Mc]}(i\,|\,F(r,i)=1) - \\ \min_{\forall i \in [1,Mc]}(i\,|\,F(r,i)=1) \end{pmatrix}.$$

Using the calculations above, if the following inequalities are true, connected region F corresponds to '7': $f7_1 >= 1$ and $f7_1 <= 2.2$ and $f7_2 >= 0.65$ and $f7_3 <= 0.4$ and $f7_4 >= 0.3$ and $f7_5 <= 0.4$ and $f7_6 > 0$.

Figure 10:
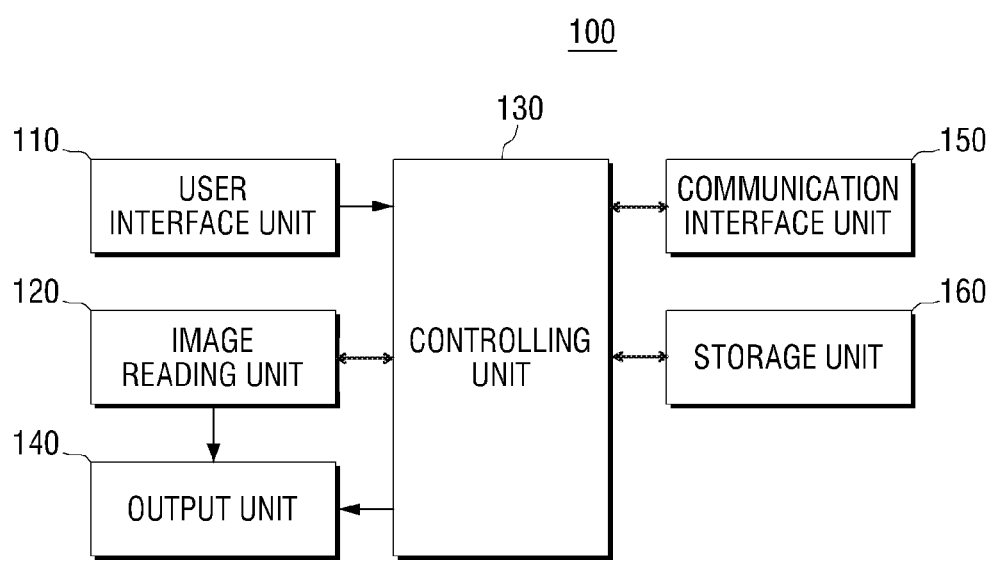
FIG. 10 is a block diagram illustrating a configuration of an image forming apparatus according to exemplary embodiments of the present general inventive concept.

FIG. 10 illustrates a block diagram of an image forming apparatus according to exemplary embodiments of the present general inventive concept.

As illustrated in FIG. 10, the image forming apparatus 100 can include a user interface unit 110, a scanning unit 120, a controlling unit 130, an output unit 140, a communication interface unit 150, and a storage unit 160.

The image forming apparatus 100 may be connected to an external device (e.g., a host device, a computer, a server, a storage device, etc.), and can output document data. The image forming apparatus 100 may have at least two functions of a printer, scanner, copier, and facsimile.

The user interface unit 110 can include a plurality of function keys with which a user may set or select one or more functions that the image forming apparatus 100 supports, and can display and/or indicate information that the image forming apparatus 100 provides. That is, the user interface unit 110 can receive selections, and may display information related to the available and/or selected functions. The user interface unit 110 may be a device which has both the input and output functions such as a touch pad, or may be a device where a mouse (or any other suitable device to receive input, such as a keyboard and/or keypad) and monitor are combined. The user may select one or more selectable options displayed in a user interface window provided through the user interface unit 110, to select a layout for copying a two-sided card. More specifically, the user interface unit 110 may provide at least one layout of copying both sides on a page with a portrait orientation, copying both sides on a page with a landscape orientation, and duplex copying.

The image reading unit 120 can read a front and back side of a two-sided card using an image sensor. More specifically, the image reading unit 120 may be a scanning unit to perform a scanning operation.

The scanning unit (i.e., the image reading unit 120) can perform a scanning operation according to a control signal and/or command from a controlling unit 130 which will be explained below. The scanning unit (i.e., the image reading unit 120) includes an image sensor unit (not illustrated), a motor unit (not illustrated), a location sensor unit (not illustrated), and a scan controlling unit (not illustrated).

The image sensor unit (not illustrated) can include a CIS sensor (not illustrated) to sense an image and obtains at least one RGB pixel value corresponding to the image. The image sensor unit can transmit a sensed RGB pixel value which will be explained below to the scan controlling unit (not illustrated).

The motor unit (not illustrated) can convey a page in a scan proceeding direction so as to sense the RG pixel value corresponding to the image in a line unit.

The location sensing unit (not illustrated) can detect a location of a page input to the image forming apparatus 100, and can transmit it to the scan controlling unit (not illustrated). The scan controlling unit (not illustrated) can control the image sensing unit (not illustrated), the motor unit (not illustrated), and the location sensing unit (not illustrated) so as to perform a scan operation according to a scan command received from the controlling unit 130 which will be described below. That is, the scan controlling unit (not illustrated) may combine the RGB pixel value sensed through the image sensing unit (not illustrated), such that the image data which corresponds to the image of the two-sided card can be generated.

The controlling unit 130 can control operations of each configurative element of the image forming apparatus 100 according to each prestored program. That is, the controlling unit 130 can control the operation of the user interface unit 110, the image reading unit 120, the output unit 140, the communication interface unit 150, and the storage unit 160. The controlling unit 130 can be central processing unit, a field programmable gate array, a programmable logic unit, a processor, an application specific integrated circuit, and/or any other suitable device to carry out the exemplary embodiments of the present general inventive concept as disclosed herein.

The controlling unit 130 can generate image data where a scanned image (e.g., an image scanned by the image reading unit 120) is laid out on at least one page according to a layout adjusted through the user interface unit 110.

The controlling unit 130 may deskew the scanned image, and detect and/or determine a direction of the scanned image.

More specifically, the controlling unit 130 may calculate coordinates of a bounding box of the scanned image, detect a skew-angle of the scanned image, and if an absolute value of the detected skew angle is 0.5° or more, may deskew the scanned image by a minus skew angle.

The output unit 140 outputs a page built (e.g., generated) by the controlling unit 130.

More specifically, the output unit 140 can print the data scanned at the image reading unit 120 according to the control by the controlling unit 130 and outputs it. For example, when the image forming apparatus 100 includes a laser printing unit, an OPC (organic photoconductor, not illustrated) surface can be electrically charged by an electrifying unit (not illustrated), and a latent image can be formed on the electrified region by an LSU (laser scanning unit—not illustrated). Herein, if a development is achieved by a developing unit (not illustrated), a toner is attached to the latent image, and thus is transferred to a page by a transfer unit (not illustrated). The transfer toner is settled on the page by a settling unit (not illustrated). However, this is only an exemplary embodiment, and it is obvious to those skilled in the art that the image forming apparatus can be applied to an inkjet output unit as well.

The communication interface unit 150 can be connected to a terminal device (not illustrated) such as a PC (personal computer), a server, a storage device, a laptop PC, a PDA, and a digital camera. More specifically, the communication unit 150 can connect to the image forming apparatus 100 to an external device. In exemplary embodiments of the present general inventive concept, the communication unit 150 can be connected to a terminal device through a Local Area Network (LAN), the Internet, and/or through a Universal Serial Bus (USB) port. The communication interface unit 150 may receive input of a printing job through the terminal device (not illustrated), and may also receive a printing operation of a corresponding printing job.

The storage unit 160 can store image data of at least one page generated by the controlling unit 130 and/or that is scanned by the image reading unit 120.

The storage unit 160 may temporarily store the print job received from the communication interface unit 150.

Herein, the storage unit 160 may be a storage medium that is, for example, a USB memory, a hard disk drive, a solid state drive, a removable disk, a storage medium connected to a host, or a web server communicatively coupled to the image forming apparatus 100 via a network.

Figure 11:
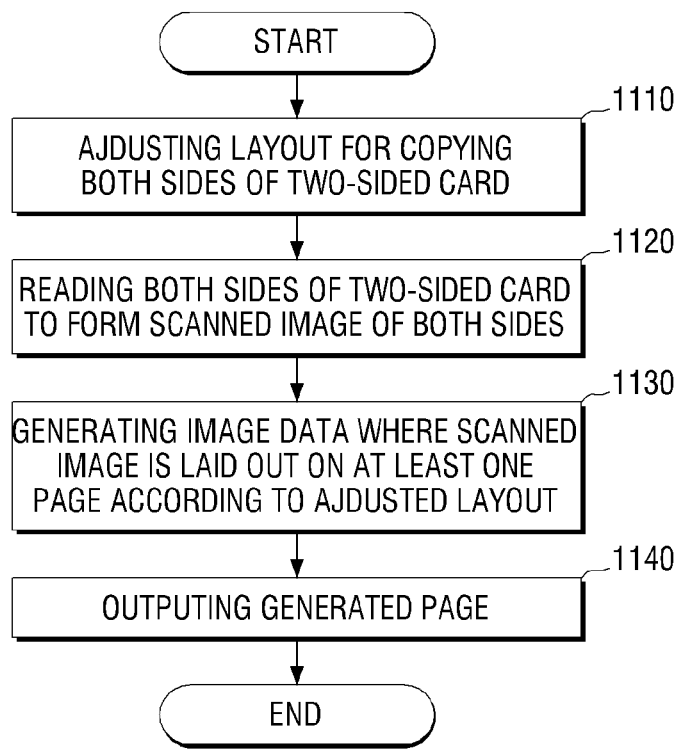
FIG. 11 is a flowchart illustrating a method of copying a two-sided card according to exemplary embodiments of the present general inventive concept.

FIG. 11 illustrates a flowchart of a two-sided card copying method according to exemplary embodiments of the present general inventive concept.

As illustrated in FIG. 11, a layout for copying both sides of the two-sided card can be adjusted at operation 1110. Herein, the layout may be at least one of copying both sides on a page with portrait orientation, copying both sides on a page with landscape orientation, and/or duplex copying, and/or any other suitable layout to carry out the exemplary embodiments of the general inventive concept as disclosed herein.

At operation 1120, the both sides of the two-sided card can be read to form scanned images of the both sides.

The image data where the images scanned at operation 1120 according to the layout adjusted at step 1110 can be generated on at least one page.

The page generated at operation 1130 can be output at operation 1140.

The image scanned at operation 1120 may be deskewed. In exemplary embodiments of the present general inventive concept, a direction of the deskewed scanned image may be detected (e.g., by the controlling unit 130 illustrated in FIG. 10). The image data of at least one page generated at operation 1130 may be stored (e.g., in storage unit 160 illustrated in FIG. 10).

The deskewing may include calculating coordinates of a bounding box of the scanned image, detecting a skew-angle of the scanned image, and when an absolute value of the detected skew-angle is 0.5° or more, rotating the scanned image by a minus skew-angle.

As aforementioned, since the exemplary embodiments of the present general inventive concept include deskewing the front and back side images of the two-sided card, detecting the direction of the front and back side images of the two-sided card, laying out both sides of the two-sided card on a page according to an adjusted layout including duplex copying, and storing at least one page where both sides of the two-sided card are rendered to a file. Thus, it is possible to copy the two-sided card using one or more of a plurality of methods. As explanation of a method of copying a two-sided card would overlap with the description of FIGS. 2 to 9 above, a more detailed explanation will be omitted.

The deskewing method of the exemplary embodiments of the present general inventive concept can detect a blank page and detect an image clipping during scanning. An orientation detection method according to exemplary embodiments of the present is based on a recognition of ciphers (e.g., Arabic digits) using a decision tree. This decision tree has an increased capacity of generalization so as to increase the recognition and orientation of ciphers.

The method according to the exemplary embodiments of the present general inventive concept may be performed by firmware of an image forming apparatus, a color MFP (multi-function peripheral), and/or a digital copier. The exemplary embodiments of the present general inventive concept can also be used in scanning software that is executed by the image forming apparatus and/or by a computer or other device coupled to the image forming apparatus.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus to copy a two-sided card, the image forming apparatus comprising:
   an image reading unit to read both sides of a two-sided card to form images of the both sides of the two-sided card; and
   an output unit to output combined images by the image forming apparatus when the read images of the two-sided card are combined according to a page layout and orientation.

2. The image forming apparatus as claimed in claim 1, further comprising:
   a controlling unit to generate an output image to be output by the image forming apparatus by combining the read images of the two-sided card according to a page layout and orientation,
   wherein the controlling unit deskews the read images so as to reduce any skew from the read images of front and back side of the two-sided card present in the images because of an orientation of the two-sided card, and detects an orientation of the read images, the orientation including an angle of each of the read images.

3. The image forming apparatus as claimed in claim 2, wherein the controlling unit deskews the front and back side images of the two-sided card by calculating coordinates of a bounding box of the read image with the controlling unit, detecting a skew-angle of the read image with the controlling unit, and when an absolute value of the skew-angle is 0.5° or more, rotating the read image by a minus skew-angle with the controlling unit.

4. The image forming apparatus as claimed in claim 3, wherein the controlling unit calculates coordinates of a bounding box of the read image by:
   calculating projections on horizontal and vertical axes with the controlling unit according to:

$$BW(r, c) = \begin{cases} 1, & R(r, c) + G(r, c) + B(r, c) < T \\ 0, & \text{otherwise,} \end{cases}$$

$$Ph(c) = \sum_{r=1}^{Nr} BW(r, c),$$

$$Pv(r) = \sum_{c=1}^{Nc} BW(r, c),$$

where, r and c are coordinates of image pixels; R, G, B are color channels of the image, Nr is a number of rows in the image, Nc is a number of columns, and T is a predetermined threshold;

filtering the projections by a filter with the controlling unit according to:

$Phf(c)=\min(Ph(c-2),Ph(c-1),Ph(c),Ph(c+1),Ph(c+2))$, $Pvf(r)=\min(Pv(r-2),Pv(r-1),Pv(r-1),Pv(r),Pv(r+1),Pv(r+2))$;

calculating bounding box coordinates $r_{min}, r_{max}$ and $c_{min}, c_{max}$ as leftmost and rightmost positions with the controlling unit according to:

$$r_{min} = \min_{\forall r}(Nr, r \mid Pvf(r) > Nc/32),$$

$$r_{max} = \max_{\forall r}(1, r \mid Pvf(r) > Nc/32),$$

$$c_{min} = \min_{\forall c}(Nc, c \mid Phf(c) > Nr/32),$$

$$c_{max} = \max_{\forall c}(1, c \mid Phf(r) > Nr/32).$$

where a magnitude of the filtered projection is greater than the predetermined threshold for vertical and horizontal projections corresponding thereto;

testing whether or not there is a blank page, where if $r_{min} > r_{max}$ or $c_{min} > c_{max}$, a blank page is detected and an alert for a user is generated with the controlling unit; and detecting a clipping of a card image with the controlling unit, wherein when $r_{max}==Nr$, it is determined that a card image is clipped and an alert for a user is generated.

5. The image forming apparatus as claimed in claim 3, wherein the controlling unit detects a skew-angle of the read image by:

extending a bounding box with the controlling unit according to:

$dc=(c_{max}-c_{min})/4, dr=(r_{max}-r_{min})/4$, $ce_{min}=\max(1,c_{min}-dc), ce_{max}=\min(Nc,c_{max}+dc)$, $re_{min}=\max(1,r_{min}-dr), re_{max}=\min(Nr,r_{max}+dr)$.

calculating distances from a top and bottom to a nearest foreground pixel of the extended bounding box, and storing the distances to distance arrays for each column according to:

$$Dt(c) = \min\left((re_{max}-re_{min}), \min_{r \in [re_{min},re_{max}]}(r \mid BW(r,c))=1\right),$$

$$Db(c) = \min\left((re_{max}-re_{min}), \max_{r \in [re_{min},re_{max}]}(r \mid BW(r,c_{max}-c))=1\right)$$

where $c \in [Ce_{min}, Ce_{max}]$;

filtering the distance arrays by a minimal filter according to:

$Dtf(c)=\min(Dt(c-4),\ldots,Dt(c),\ldots,Dt(c+4))$ $Dbf(c)=\min(Db(c-4),\ldots,Db(c),\ldots,Db(c+4))$ calculating derivatives of the distance arrays according to:

$dDtf(c)=Dtf(c+4)-Dtf(c-4)$ $dDbf(c)=Dbf(c+4)-Dbf(c-4)$ selecting straight ranges on the distance arrays according to:

$$\{St(i)\} = \left\{ \begin{array}{l} \forall |dDtf(c)| \leq 10, (st2(i)-st1(i)) \geq 50, \\ c \in [st1(i),st2(i)] \\ Dtf(st2(i)) < 3(re_{max}-re_{min})/4 \end{array} \right\},$$

$i = 1 \ldots Nt$, $$\{Sb(j)\} = \left\{ \begin{array}{l} \forall |dDbf(c)| \leq 10, (sb2(j)-sb1(j)) \geq 50, \\ c \in [sb1(j),sb2(j)] \\ Dbf(sb2(j)) < 3(re_{max}-re_{min})/4 \end{array} \right\},$$

$j = 1 \ldots Nb$, where $\{st1\}$ and $\{sb1\}$ are coordinates of beginning of the straight ranges on the distance arrays from the top and bottom of the bounding box correspondingly, $\{st2\}$ and $\{sb2\}$ are coordinates of ending of straight ranges on distance arrays from the top and bottom of bounding box correspondingly, and Nt and Nb are numbers of the straight ranges on the distance arrays from the top and bottom of bounding box correspondingly;

calculating angles of all the straight ranges with the controlling unit according to:

$dx(i) = st2(i) - st1(i) - 20$, $dx(j+Nt) = sb2(j) - sb1(j) - 20$, $$dy(i) = \frac{1}{5}\sum_{k=-2}^{2} Dtf(st2(i)-10+k) - \frac{1}{5}\sum_{k=-2}^{2} Dtf(st1(i)+10+k),$$

$$dy(j+Nt) = \frac{1}{5}\sum_{k=-2}^{2} Dbf(sb2(i)-10+k) - \frac{1}{5}\sum_{k=-2}^{2} Dbf(sb1(i)+10+k),$$

$\alpha(n) = \arctg_a(dy(n)/dx(n)), N = Nb + Nt, n = 1 \ldots N$, where $\{dx\}$ is an array of adjacent cathetus, $\{dy\}$ is an array of opposite cathetus, and $\{\alpha\}$ is an array of angles; and estimating a skew-angle from the angle arrays with the controlling unit, where an initial estimation of a weighted average of angles $\phi$ and variance $\delta$ are according to:

$$\varphi = \sum_{n=1}^{N} \alpha(n) \times dx(n) / \sum_{n=1}^{N} dx(n)$$

$$\delta = \frac{1}{N-1}\sqrt{\sum_{n=1}^{N}(\varphi-\alpha(n))^2}$$

wherein, when $\delta > 25$, a special process of estimating positive and negative angles which are close to 45 and −45 degrees is performed according to:

$$bp(x) = \left\{\begin{array}{l} 1, x > 38° \\ 0 \end{array}\right., \quad bn(x) = \left\{\begin{array}{l} 0, x < -38° \\ 0 \end{array}\right.,$$

$$qap = \sum_{n=1}^{N} bp(\alpha(n)), \quad qan = \sum_{n=1}^{N} bn(\alpha(n)),$$

$$sap = \sum^{N} \alpha(n) \times bp(\alpha(n)), \quad san = \sum^{N} \alpha(n) \times bn(\alpha(n)),$$

and when $qap>0$ and $qan>0, \delta0$, then $\delta=0$, and if $sap>san$, then $\phi=sap/qap$, or else $\phi=sap/qan$, and iterations are continued according to:

$$\varphi = \sum_{n=1}^{N} \alpha(n) \times dx(n) / \sum_{n=1}^{N} dx(n)$$

-continued $$\delta = \frac{1}{N-1}\sqrt{\sum_{n=1}^{N}(\varphi - \alpha(n))^2}$$

and when variance $\delta > 1$, when $(\alpha(n) < \phi - \delta)$ or $(\alpha(n) < \phi + \delta)$, then $\alpha(n)$ and $dx(n)$ are excluded from one or more arrays, and estimation of weighted average of angles $\phi$ and variance $\delta$ are performed.

6. The image forming apparatus as claimed in claim 3, wherein a rotation of the image on skew angle $\phi$ is performed via two shears with the controlling unit according to the following transformation matrices:

$$[x^1 \ y^1] = [x \ y]\begin{bmatrix} \cos\varphi & -\sin\varphi \\ \sin\varphi & \cos\varphi \end{bmatrix}$$

7. The image forming apparatus as claimed in claim 2, wherein the controlling unit detects an orientation of front and back images of the two-sided card by:
high-pass filtering of image brightness channel by convolution with a kernel and the controlling unit according to:

$$\begin{bmatrix} 1 & 0 & 1 & 0 & 1 \\ 0 & 0 & 0 & 0 & 0 \\ 1 & 0 & -8 & 0 & 1 \\ 0 & 0 & 0 & 0 & 0 \\ 1 & 0 & 1 & 0 & 1 \end{bmatrix};$$

labeling connected regions for pixels of the filtered image which are greater than the predetermined threshold T1 with the controlling unit;
labeling connected regions for pixels of the filtered image which are less than the predetermined threshold −T1 with the controlling unit;
selecting connected regions with an appropriate size of a bounding box with the controlling unit;
recognizing '1', '2', '3', '4', '5', '7' ciphers that have one of four orientations 0°, 90°, 180°, 270° for each connected region, and calculating the number of recognized ciphers for each orientation with the controlling unit; and
determining an orientation of a card image based on the number of recognized ciphers for each orientation with the controlling unit.

8. The image forming apparatus as claimed in claim 7, wherein the controlling unit detects an orientation of a card image according to:

$$\Omega = \left. i \right|_{i \in \{0,90,180,270\}} \max((0.5N_1(i) + N_2(i) + N_3(i) + N_4(i) + N_5(i) + 0.5N_7(i)) \times \times (\mathrm{sign}(N_1(i)) + \mathrm{sign}(N_2(i)) + \mathrm{sign}(N_3(i)) + \mathrm{sign}(N_4(i)) + \mathrm{sign}(N_5(i)) + \mathrm{sign}(N_7(i))))$$

wherein $N_1(i)$, $N_2(i)$, $N_3(i)$, $N_4(i)$, $N_5(i)$ and $N_7(i)$ are numbers of recognized regions as ciphers '1', '2', '3', '4', '5', '7,' respectively, for orientation i.

9. The image forming apparatus as claimed in claim 7, wherein recognition of the '1' cipher is determined where:

$$f1_1 = Mr/Mc;$$

$$f1_2 = \max\begin{pmatrix} \sum_{r=1}^{Mr} \sum_{c=Mc-1}^{Mc} F(r,c); \\ \sum_{r=1}^{Mr} \sum_{c=Mc-2}^{Mc} F(r,c) \end{pmatrix} / (2Mr);$$

$$f1_3 = \sum_{r=Mr/2}^{Mr} \sum_{c=1}^{Mc/2-1} F(r,c);$$

$$f1_4 = \sum_{r=1}^{Mc/2-1} \sum_{c=1}^{Mc/2-r} F(r,c); \text{ and}$$

$$f1_5 = \sum_{r=Mc/2}^{Mr/2} \sum_{c=2}^{3} F(r,c).$$

10. The image forming apparatus as claimed in claim 7, wherein recognition of the '2' cipher is determined where:

$$f2_1 = Mr/Mc;$$

$$f2_2 = \max\begin{pmatrix} \sum_{r=Mr}^{Mr} \sum_{c=1}^{Mc} F(r,c); \\ \sum_{r=Mr-2}^{Mr-1} \sum_{c=1}^{Mc} F(r,c) \end{pmatrix} / (2Mc);$$

$$f2_3 = \sum_{c=3Mr/5}^{3Mr/4} \sum_{r=0}^{c-3Mr/5} F(Mr-r,c);$$

$$f2_4 = \sum_{r=1}^{2} \sum_{c=1}^{2} F(r,c) + \sum_{r=1}^{2} \sum_{c=Mc-1}^{Mc} F(r,c);$$

$$f2_5 = \max\begin{pmatrix} \sum_{r=1}^{2} \sum_{c=Mc/3}^{2Mc/3} F(r,c); \\ \sum_{r=2}^{3} \sum_{c=Mc/3}^{2Mc/3} F(r,c) \end{pmatrix} / (2(Mc/3+1));$$

$$f2_6 = \max\begin{pmatrix} \sum_{r=Mr/5}^{2Mr/5} \sum_{c=Mc-1}^{Mc} F(r,c); \\ \sum_{r=Mr/5}^{2Mr/5} \sum_{c=Mc-2}^{Mc-1} F(r,c) \end{pmatrix} / (2(Mr/5+1)); \text{ and}$$

$$f2_7 = \sum_{r=Mr/2}^{2Mr/3} \sum_{c=1}^{2Mr/3-r+1} F(r,c),$$

wherein F is a binary image of a connected region, and Mr × Mc is size of the image F.

11. The image forming apparatus as claimed in claim 7, wherein recognition of the '3' cipher is determined by:

$$f3_1 = Mr/Mc;$$

$$f3_2 = \max\begin{pmatrix} \sum_{r=1}^{2} \sum_{c=Mc/3}^{2Mc/3} F(r,c); \\ \sum_{r=2}^{3} \sum_{c=Mc/3}^{2Mc/3} F(r,c) \end{pmatrix} / (2(Mc/3+1));$$

$$f3_3 = \max\left(\begin{array}{c}\sum_{r=Mr-1}^{Mr}\sum_{c=Mc/3}^{2Mc/3}F(r,c);\\ \sum_{r=Mr-2}^{Mr-1}\sum_{c=Mc/3}^{2Mc/3}F(r,c)\end{array}\right)\Big/(2(Mc/3+1));$$

$$f3_4 = \max\left(\begin{array}{c}\sum_{r=3Mr/5}^{4Mr/5}\sum_{c=Mc-1}^{Mc}F(r,c);\\ \sum_{r=3Mr/5}^{4Mr/5}\sum_{c=Mc-2}^{2Mc-1}F(r,c)\end{array}\right)\Big/(2(Mr/5+1));$$

$$f3_5 = \max\left(\begin{array}{c}\sum_{r=Mr/5}^{2Mr/5}\sum_{c=Mc-2}^{Mc-1}F(r,c);\\ \sum_{r=Mr/5}^{2Mr/5}\sum_{c=Mc-3}^{2Mc-2}F(r,c)\end{array}\right)\Big/(2(Mr/5+1));$$

$$f3_6 = \max\left(\begin{array}{c}Mc - \max_{\forall i \in [1,Mc]}(i\mid F(Mr/2, i) = 1),\\ Mc - \max_{\forall i \in [1,Mc]}(i\mid F(Mr/2-1, i) = 1),\\ Mc - \max_{\forall i \in [1,Mc]}(i\mid F(Mr/2-2, i) = 1),\end{array}\right)\Big/Mc;$$

$$f3_7 = \min\left(\begin{array}{c}\min_{\forall i \in [1,Mc]}(i\mid F(Mr/2, i) = 1),\\ \min_{\forall i \in [1,Mc]}(i\mid F(Mr/2-1, i) = 1),\\ \min_{\forall i \in [1,Mc]}(i\mid F(Mr/2+1, i) = 1),\end{array}\right)\Big/Mc;$$

$$f3_8 = \sum_{r=Mr-1}^{Mr}\sum_{c=1}^{2}F(r,c) + \sum_{r=Mr-1}^{Mr}\sum_{c=Mc-1}^{Mc}F(r,c);$$

$$f3_9 = 15\sum_{r=Mr/3+1}^{2Mr/3}\sum_{c=1}^{2Mc/5}F(r,c)/(2McMr);$$

$$f3_{10} = \sum_{r=1}^{2}\sum_{c=1}^{2}F(r,c) + \sum_{r=1}^{2}\sum_{c=Mc-1}^{Mc}F(r,c);$$

$$f3_{11} = 64\sum_{r=Mr/3-(Mr-2)/16}^{Mr/3+(Mr-2)/16}\sum_{c=Mc/2-(Mc-2)/16}^{Mc/2+(Mc-2)/16}F(r,c)/((Mc-2)(Mr-2));$$

$$f3_{12} = 64\sum_{r=2Mr/3-(Mr-2)/16}^{2Mr/3+(Mr-2)/16}\sum_{c=Mc/2-(Mc-2)/16}^{Mc/2+(Mc-2)/16}F(r,c)/((Mc-2)(Mr-2));$$

$$f3_{13} = \left(\left(\max_{\forall j \in [Mr/4, Mr/2-(Mr-2)/16]}\left(\min_{\forall i \in [1,Mc]}(i\mid F(j,i)=1)\right)\right)-1\right)\Big/Mc;$$

$$f3_{14} = \left(\left(\max_{\forall j \in [Mr/2+(Mr-2)/16, 3Mr/4]}\left(\min_{\forall i \in [1,Mc]}(i\mid F(j,i)=1)\right)\right)-1\right)\Big/Mc; \text{ and}$$

$$f3_{15} = 64\sum_{r=Mr/2-(Mr-2)/16}^{Mr/2+(Mr-2)/16}\sum_{c=Mc/2+1-(Mc-2)/16}^{Mc/2+1+(Mc-2)/16}F(r,c)/((Mc-2)(Mr-2));$$

where F is binary image of a connected region, and Mr x Mc is size of the image F.

12. The image forming apparatus as claimed in claim 7, wherein recognition of the '4' cipher is determined by:

$$f4_1 = Mr/Mc;$$

$$f4_2 = \sum_{r=1}^{Mc/3}\sum_{c=1}^{Mc/3-r-1}F(r,c);$$

$$f4_3 = \sum_{r=5Mr/6+1}^{Mr}\sum_{c=1}^{Mc/3}F(r,c);$$

$$f4_4 = \max_{i \in [Mr/2+2; 4Mr/5]}\left(\sum_{c=1}^{Mc}F(i,c)\right)\Big/Mc;$$

$$f4_5 = \max_{j \in [3Mc/4; Mc/6]}\left(\sum_{r=Mr/2}^{Mr}F(r,j)\right)\Big/Mr;$$

$$f4_6 = \left(\begin{array}{c}\sum_{r=1}^{Mr/2}\sum_{c=Mc-1}^{Mc}F(r,c) +\\ 3\sum_{r=5Mr/6}^{Mr}\sum_{c=Mc-1}^{Mc}F(r,c)\end{array}\right)\Big/Mr;$$

$$f4_7 = \sum_{r=Mr/5}^{Mr/2}\sum_{c=Mc/5}^{Mc/2}F(r,c)/((3Mr/10+1)(3Mc/10+1)); \text{ and}$$

$$f4_8 = 64$$

$$\min\left(\begin{array}{c}\sum_{r=Mr/2+1-(Mr-2)/16}^{Mr/2+1+(Mr-2)/16}\sum_{c=Mc/2+1-(Mc-2)/16}^{Mc/2+1+(Mc-2)/16}F(r,c),\\ \sum_{r=Mr/2+1-(Mr-2)/16}^{Mr/2+1+(Mr-2)/16}\sum_{c=Mc/2-(Mc-2)/16}^{Mc/2+(Mc-2)/16}F(r,c),\end{array}\right)\Big/((Mc-2)(Mr-2));$$

where F is a binary image of a connected region, and Mr x Mc is size of the image F.

13. The image forming apparatus as claimed in claim 7, wherein recognition of the '5' cipher is determined by:

$$f5_1 = Mr/Mc;$$

$$f5_2 = \max\left(\begin{array}{c}\sum_{r=1}^{2}\sum_{c=3}^{Mc-2}F(r,c);\\ \sum_{r=2}^{3}\sum_{c=3}^{Mc-2}F(r,c)\end{array}\right)\Big/(2(Mc-4));$$

$$f5_3 = \max\left(\begin{array}{c}\sum_{r=Mr-1}^{Mr}\sum_{c=Mc/3}^{2Mc/3}F(r,c);\\ \sum_{r=Mr-2}^{Mr-1}\sum_{c=Mc/3}^{2Mc/3}F(r,c)\end{array}\right)\Big/(2(Mc/3+1));$$

$$f5_4 = \left(Mc - \left(\min_{\forall j \in [Mr/5+1, 2Mr/5]}\left(\max_{\forall i \in [1,Mc]}(i\mid F(j,i)=1)\right)\right)\right)\Big/Mc;$$

$$f5_5 = 25\max\left(\begin{array}{c}\sum_{r=Mr/5+1}^{2Mr/5}\sum_{c=1}^{Mc/5}F(r,c);\\ \sum_{r=Mr/5+1}^{2Mr/5}\sum_{c=Mc/5}^{2Mc/5}F(r,c)\end{array}\right)\Big/(McMr);$$

$$f5_6 = \left(\min_{\forall i \in [3Mr/5, Mr]}(i\mid F(i,j)=1) \text{ and } j \in [Mc/2, Mc]\right)\Big/Mr; \text{ and}$$

$$f5_7 = \sum_{r=Mr-1}^{Mr}\sum_{c=Mc-1}^{Mc}F(r,c).$$

14. The image forming apparatus as claimed in claim 7, wherein recognition of the '7' cipher is determined by:

$$f7_1 = Mr/Mc;$$

$$f7_2 = \max\begin{pmatrix} \sum_{r=1}^{2}\sum_{c=1}^{Mc} F(r,c); \\ \sum_{r=2}^{3}\sum_{c=1}^{Mc} F(r,c) \end{pmatrix} \Big/ (2Mc);$$

$$f7_3 = \left( \max_{\forall j \in [Mr/4, Mr]} \begin{pmatrix} \max_{\forall i \in [1,Mc]} (i \mid F(j,i)=1) - \\ \min_{\forall i \in [1,Mc]} (i \mid F(j,i)=1) \end{pmatrix} \right) \Big/ Mc;$$

$$f7_4 = \left( Mc - \frac{4}{Mr}\sum_{r=3Mr/4}^{Mr} \begin{pmatrix} \max_{\forall i \in [1,Mc]} (i \mid F(r,i)=1) - \\ \min_{\forall i \in [1,Mc]} (i \mid F(r,i)=1) \end{pmatrix} \right) \Big/ Mc;$$

$$f7_5 = \left( Mc - \frac{4}{Mr}\sum_{r=Mr/4}^{Mr/2} \begin{pmatrix} \max_{\forall i \in [1,Mc]} (i \mid F(r,i)=1) - \\ \min_{\forall i \in [1,Mc]} (i \mid F(r,i)=1) \end{pmatrix} \right) \Big/ Mc;$$

$$f7_6 = \sum_{r=Mr/4}^{Mr/2} \begin{pmatrix} \max_{\forall i \in [1,Mc]} (i \mid F(r,i)=1) - \\ \min_{\forall i \in [1,Mc]} (i \mid F(r,i)=1) \end{pmatrix} -;$$

$$\text{and } \sum_{r=3Mr/4}^{Mr} \begin{pmatrix} \max_{\forall i \in [1,Mc]} (i \mid F(r,i)=1) - \\ \min_{\forall i \in [1,Mc]} (i \mid F(r,i)=1) \end{pmatrix}.$$

\* \* \* \* \*